(12) United States Patent
Mittal

(10) Patent No.: US 7,827,218 B1
(45) Date of Patent: Nov. 2, 2010

(54) DETERMINISTIC LOOKUP USING HASHED KEY IN A MULTI-STRIDE COMPRESSED TRIE STRUCTURE

(75) Inventor: Millind Mittal, Palo Alto, CA (US)

(73) Assignee: X-Engines, Inc., Palo Alto, CA (US)

( * ) Notice: Subject to any disclaimer, the term of this patent is extended or adjusted under 35 U.S.C. 154(b) by 860 days.

(21) Appl. No.: 11/740,233

(22) Filed: Apr. 25, 2007

Related U.S. Application Data

(60) Provisional application No. 60/898,171, filed on Jan. 27, 2007, provisional application No. 60/860,112, filed on Nov. 18, 2006.

(51) Int. Cl.
G06F 17/30 (2006.01)

(52) U.S. Cl. ........................... 707/899; 370/389
(58) Field of Classification Search ............ 707/999.06; 370/389, 401, 392; 709/238, 225; 711/216
See application file for complete search history.

(56) References Cited

U.S. PATENT DOCUMENTS

| | | | |
|---|---|---|---|
| 5,105,353 A | 4/1992 | Charles et al. | |
| 5,276,868 A | 1/1994 | Poole | |
| 5,640,551 A | 6/1997 | Chu et al. | |
| 5,651,099 A | 7/1997 | Konsella | |
| 5,781,772 A | 7/1998 | Wilkinson, III et al. | |
| 5,813,001 A | 9/1998 | Bennett | |
| 6,067,574 A | 5/2000 | Tzeng | |
| 6,691,131 B2 | 2/2004 | Tikkanen et al. | |
| 6,697,363 B1 | 2/2004 | Carr | |
| 6,782,382 B2 | 8/2004 | Lunteren | |
| 6,910,043 B2 | 6/2005 | Iivonen et al. | |
| 7,007,101 B1 | 2/2006 | Schwaderer | |
| 7,019,674 B2 | 3/2006 | Cadambi et al. | |
| 7,325,059 B2 * | 1/2008 | Barach et al. ............ | 709/225 |
| 7,430,560 B1 * | 9/2008 | Mittal ............... | 1/1 |
| 7,444,318 B2 * | 10/2008 | Sahni et al. ............. | 1/1 |
| 7,474,657 B2 * | 1/2009 | Sahni et al. ............. | 370/392 |
| 7,702,629 B2 * | 4/2010 | Cytron et al. ............ | 1/1 |
| 2004/0111440 A1 | 6/2004 | Richardson et al. | |
| 2004/0117600 A1 | 6/2004 | Bodas et al. | |
| 2004/0141509 A1 * | 7/2004 | Sahni et al. ............. | 370/401 |
| 2004/0167923 A1 * | 8/2004 | Carr ..................... | 707/102 |
| 2004/0258061 A1 * | 12/2004 | Sahni et al. ............. | 370/389 |
| 2005/0187898 A1 | 8/2005 | Chazelle et al. | |

\* cited by examiner

*Primary Examiner*—Hung T Vy
(74) *Attorney, Agent, or Firm*—gPatent LLC; Stuart T. Auvinen

(57) ABSTRACT

An input lookup key is hashed and the hashed key divided into stride bits into a multi-level Trie structure. A compression function logically combines the stride bits to generate the compressed index bits into the stride tables. The bucket in the last stride table found by the hashed key may have several keys that collide at the same hash value. Discriminant bits are read from the key and select a stored key in the bucket table for verification of its result. Since the hashed key is a compression of the longer input key, more information is contained per bit of the hashed key than in the long key. The multi-stride lookup is performed first on the hashed key, allowing a faster convergence to the lookup result. The first stride can index a single hash table, with the remaining hash bits and discriminant bits used to select from among colliding keys.

5 Claims, 17 Drawing Sheets

75% SIZE REDUCTION

8B/ENTRY

US 7,827,218 B1

DETERMINISTIC LOOKUP USING HASHED KEY IN A MULTI-STRIDE COMPRESSED TRIE STRUCTURE

RELATED APPLICATION

This application claims the benefit of U.S. Provisional Applications 60/860,112 filed Nov. 18, 2006 and 60/898,171 filed Jan. 27, 2007. This application is related to the co-pending U.S. Patent Application for "Multi-Level Compressed Look-up Tables Formed by Logical Operations to Compress Selected Index Bits", U.S. Ser. No. 11/309,160, filed Jul. 2, 2006, which claims the benefit of U.S. Provisional Applications 60/701,442 filed Jul. 22, 2005 and 60/720,712 filed Sep. 27, 2005.

FIELD OF THE INVENTION

This invention relates to table lookups, and more particularly to look-up engines for large table structures divided into strides.

BACKGROUND OF THE INVENTION

Modern data structures may contain huge amounts of data. For example, large networks can have millions or billions of destinations and millions of intermediate nodes, and each node may be identified by its own network address.

Traffic in a network may be routed by looking up records in a routing table or structure. The widely-used Internet Protocol, version 4 (IPv4) uses 32-bit IP addresses and can support up to $2^{32}$ IP nodes, or about 4 billion addresses. A newer version, IPv6, uses 128-bit IP addresses and can have $2^{128}$ IP-addressable nodes. Each record in a data structure might contain one IP address or a range of IP addresses. Routers, switches, and other network nodes may contain a subset of the available IP addresses.

A linear binary search may be used on multiple levels of lookup. Each bit of an input lookup key is used to decide between forks in paths through a tree-like table structure. Since multiple levels of search are required, search time is slow, although the storage space needed for the table is more efficient. A traditional Trie structure has a number of access levels equal to a number of bits in the input key. Each stride, or jump to the next level, consumes one bit of the input key.

A compromise data structure modifies the Trie structure to use strides of more than one bit. This structure can provide a good trade-off between access speed and storage requirements.

FIG. 1 shows prior-art stride tables in a multi-bit Trie structure. Key 18 is the lookup key that is input to the table structure. A lookup is an operation to find an entry in the table structure that matches key 18. Key 18 is divided into four strides S1, S2, S3, S3. In this simplified example, key 18 is only 8 bits wide, and each stride is 2 bits wide.

First stride S1 selects one of four entries in first-level stride table 10. Entries in table 10 contain pointers to tables 12 in the second level. For example, the top second-level table 12 is pointed to by the top entry in table 10, which is selected when S1 is 11. Another second-level table 12' is pointed to by the third entry in table 10, which is selected when S1 is 01.

Since each stride is 2 bits, each entry in one level points to a table of 4 entries in the next level. Thus a single table 10 in level 1 expands to four tables 12 in the second level, sixteen tables 14 in the third level, and sixty-four tables 16 in the fourth level. A lookup is performed by traversing the four levels of the tables in the table structure. For the example of key 18 having a value of 01110011, the first stride S1 is 01 and selects the third entry in table 10, which points to table 12' in level 2.

The two stride bits 11 for S2 select from among the four entries in each of tables 12. Since first-level stride table 10 pointed to table 12', an entry from selected table 12' is used and other tables 12 are ignored. The top entry in table 12' is selected by the value (11) of S2. This top entry contains a pointer to selected table 14' in level 3.

The two stride bits S3 of level three select from among the four entries in selected table 14' in the third level. The value of S3 is 00, which selects the lowest entry in selected table 14'. This entry has a pointer to one of the 64 tables in level four, selected table 16'.

The value of the fourth stride S4, 11, selects the upper of four entries in selected stride table 16'. This entry contains the result of the lookup, or a pointer to the result. The value 01110011 of key 18 returns this result. Both the key and the result may be composed of several fields that are combined together.

When longest-prefix matches (LPM) are supported, intermediate results may be stored in entries in tables 10, 12, 14 of the intermediate levels, rather than only at the end (leaf) levels.

While such Trie structures modified for multi-bit strides are useful compromises between a fast but large single-level table, and a slow but storage-efficient Trie structure, the storage requirements may still be large using stride tables.

The parent application disclosed using compression functions to compress stride tables. Network tables tend to be sparse tables since the address locations are sparsely populated with valid entries. Most memory locations tend to be empty, or have invalid entries.

Since network tables are sparse, the valid entries in a stride table may be compressed to squeeze out invalid entries and reduce the storage requirements. Ideally, only the valid entries would be stored, but in practice some invalid entries are also stored in the compressed tables. Thus the degree of compression may be less than ideal.

Rather than simply masking or deleting index bits to compress a table, index bits may be compressed using various functions. For example, two or more index bits may be combined together into a single index bit using a logical function such as a logical XOR. A variety of compression functions may be used such as XOR, AND, OR, rotate, shifts, and conditional operations. A field in the table entry can indicate which logical functions to perform for the next level of stride tables. Thus the different logical functions may be mixed together within a table structure to optimize compression.

FIG. 2 shows a logically-compressed stride table as described in more detail in the parent application. Table 20 is a stride table such as one of tables 10, 12, 14, 16 of FIG. 1. In FIG. 2, the current stride size is 4 bits. The current stride of the input key is used as a 4-bit index address that selects one of the 16 entries in stride table 20. Each entry in stride table 20 is in a location identified by a 4-bit index of bits A3, A2, A1, A0. Stride table 20 contains only 4 valid entries, at index locations 1100, 1011, 1001, and 1000. The other 12 indexes contain invalid or empty entries.

Since all four valid entries have a 1 in the most-significant-bit (MSB) of the index, or A3=1, index bit A3 is not needed to select among the four valid entries. Index bit A3 could be removed or masked from stride table 20, as was shown in prior-art FIG. 2. The entries with A3=0 are deleted, since they are all empty entries. Only the entries with A3=1 are retained in compressed stride table 20'.

Further compression can be achieved by combining two of the remaining three index bits to create a new index bit. In this example, index bits A2 and A1 are combined by an XOR function to generate a new A1 index bit. The old A2 and A1 index bits are replaced by this new A1 index bit. The result is that a 2-bit index is used in compressed stride table 22 to select among the 4 entries in table 22.

The size of stride table 22 has been reduced by 75% by masking one index bit (A3) and logically combining two other index bits (A2, A1). Empty entries are removed from compressed stride table 22. Other stride tables could also be compressed, reducing the overall storage requirements.

Two steps were performed to compress the 4 index bits down to 2 index bits. First, one of the index bits (A3) was masked out. Second, two index bits (A2, A1) were logically combined into one index bit (the new A1). The XOR function used for this logical combining is a compression function (CF). Other compression functions may be used for other tables, such as AND, OR, rotate, shift, or more complex functions such as AND-OR, etc.

FIG. 3 shows storing of compression functions (CF) in a stride-table entry. While compression functions could be fixed in hardware or software routines or specified in other ways, storing the compression function in the stride table entry allows different compression functions to be used for different stride tables within the table structure. Thus compression for each table may be optimized, resulting in better overall compression. The compression may even adapt to the type of entries being stored, or to entry changes that occur over time.

Entry 50 is a valid entry in a stride table in level N. Stride bits Sn are extracted from the input key and used to select this entry from other entries in the Nth level of the stride tables. The value of these stride bits Sn are stored in tag field 52 and compared to the input stride bits Sn to ensure a match. Aliasing and other errors are thus avoided.

The number of bits in the next level of the stride table is stored. For example, a value of 0111 could indicate that 8 bits of the input key are used for the stride bits in the next level N+1. In some embodiments, the stride sizes are fixed and next stride size field is not needed.

The compression function (CF) to use for compressing the stride bits to generate the compressed index for the next level N+1 of the stride table is indicated by CF field 60. CF field 60 may include opcode field 62 with a function-type field that indicates the logical function (XOR, shift, etc.). Operand field 64 may contain control bits that control the function, such as indicating a number of positions to shift by, or which bit-positions to use as inputs. A bit mask may be stored in operand field 64. This may be the initial mask (IM) used by an initial masker, or a final mask used by a final masker, or some other mask. The mask may be encoded or compressed in some way, or could be a bit-by-bit mask. Positive or negative masks may be used.

The exact format of CF field 60 may be data-dependent, with some CF functions requiring more control bits than other functions. Opcode field 62 may have a fixed number of bits while operand field 64 varies in width. Decoding of opcode field 62 can determine the number of bits in operand field 64.

Each valid entry 50 in the stride table at level N points to another whole stride table in the next level N+1. Pointer field 58 contains a pointer to the stride table in the next level N+1. The compression function specified in CF field 60 is used to compress the next level stride bits $S_{N+1}$, to find the entry in the next-level stride table pointed to by pointer field 58. Pointer field 58 could contain a full address or a partial address, offset, or some other way of indicating the next stride table.

The final level of stride tables does not point to another level. Instead, pointer field 56 contains a pointer to a lookup result, or could contain the result itself. Some fields may be optional for some kinds of entries. Sometimes, a partial lookup is performed. There may be some valid entries for which only some of the input key's bits are matched; other input key bits are ignored (don't cares). These are referred to as regional entries. For example, the 15 most-significant-bits (MSB's) of a key are matched while the remaining 17 LSB's are ignored. When the first and second level strides are each 8 bits wide, then the second-level stride only matches 7 of the 8 stride bits. For some lookups, such as longest-prefix matches (LPM), both result pointer field 56 and next-level pointer field 58 may be valid. When both pointers are valid, then result pointer field 56 indicates the result when no more-precise match is found.

MSB-to-use field 54 indicates that only the 7 MSB's of the 8 stride bits are matched when comparing tag field 52 to the input key. For a regional entry in the database, it is possible to successfully terminate the search prior to completely traversing all of the levels. A match may be identified prior to traversing all of the levels. This may occur when a search key matches a regional entry, and there is no exact match entry present for a given search key. In this case, there is a valid result available even prior to completing traversal. In this case the result may be provided in field 56.

While using compression functions to reduce the sizes of stride tables is useful, the input key that is divided into strides is sometimes quite long. Input keys of 500 bits or more may occur in some applications, such as for IPv6 networks. These extremely long keys may require many strides, or may require long strides. For example, a 512-bit key could be divided into 64 strides of 8-bits per stride, or into 8 strides of 64-bits per stride. Neither option is desirable, resulting in too many levels of stride tables, or in excessively large stride tables. What is desired is a multi-stride lookup structure that uses a more compressed input key to increase efficiency, and to reduce a number of levels of stride tables needed. Efficient memory management is further desired for stride tables and associated structures.

DETAILED DESCRIPTION

Figure 1:
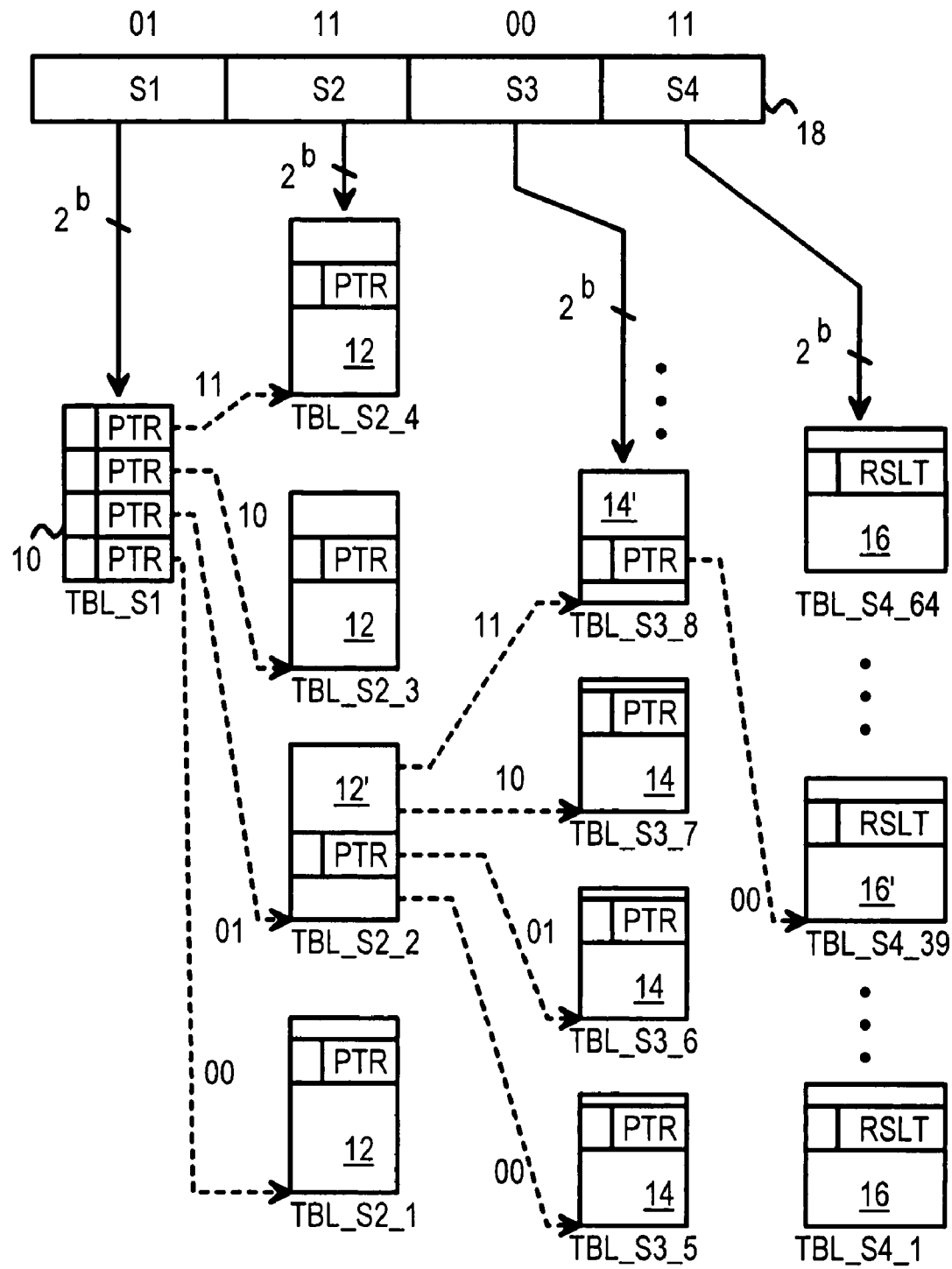
FIG. 1 shows prior-art stride tables in a multi-bit Trie structure.
Figure 2:
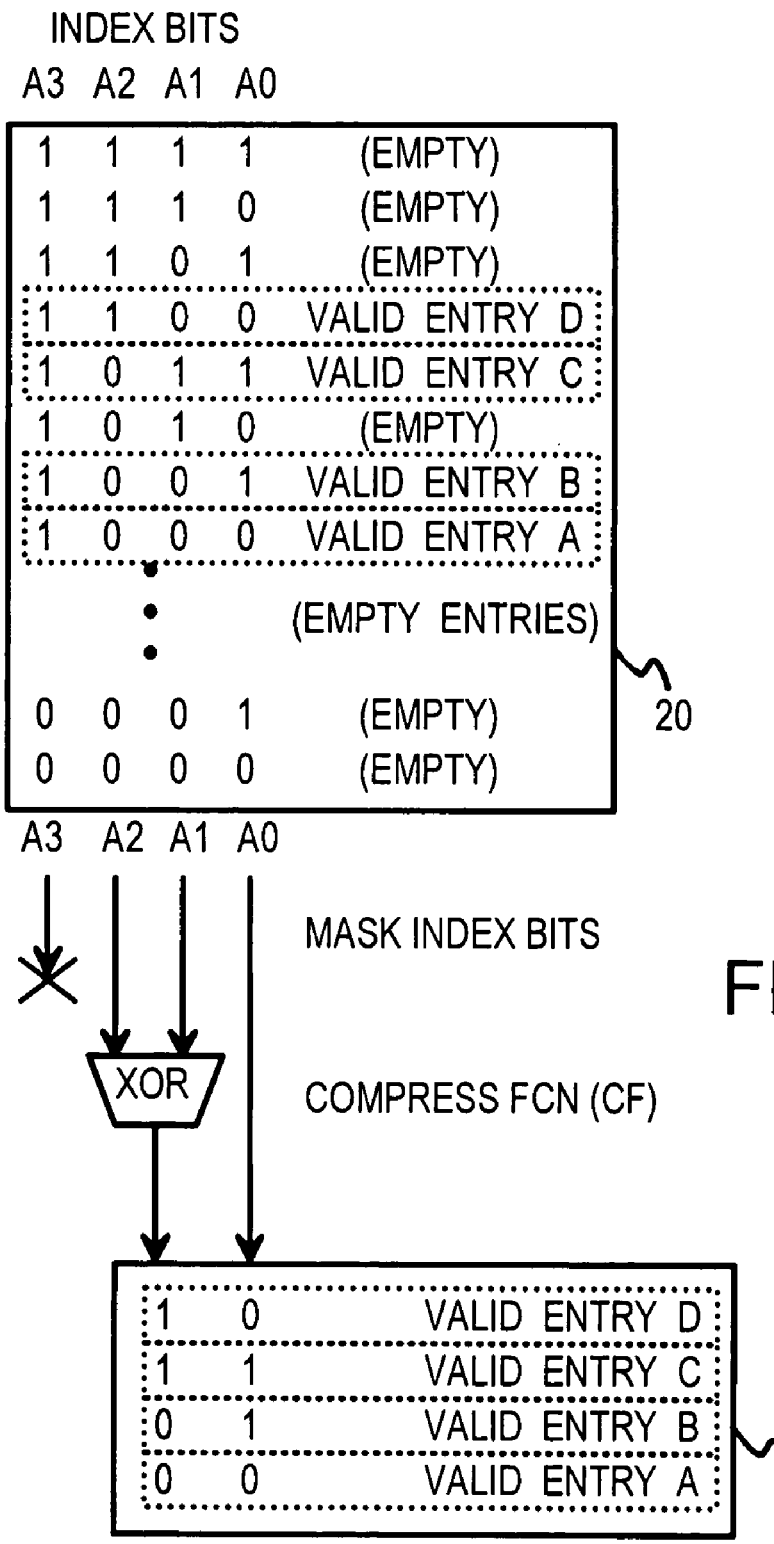
FIG. 2 shows a logically-compressed stride table as described in more detail in the parent application.

The present invention relates to an improvement in lookup table structures. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

A typical hash is not deterministic due to collisions. The inventor's approach achieves a smaller memory size, but is still quasi-deterministic for practical purposes. The probability of failure due to collisions is similar to the probability of soft errors. In the extreme case of collisions, there is a way to resolve the collisions. The inventor has realized that very wide hash keys that are necessary to reduce the probability of collision can themselves be represented in compressed graphs instead of a linear array. Additionally, for each bucket multiple collisions can be supported (such as 3-6 collisions) in the form of a compressed bucket table.

The hash of the key, referred to as the hashed key, is pre-pended to the long input key. Since the hashed key is a digest or compression of the information in the longer input key, more information is contained per bit of the hashed key than in the long key. Wider hashed keys reduce the probability of collision within a hash bucket.

The multi-stride lookup is performed first on the hashed key, allowing a faster convergence to the lookup result. After the hashed key is parsed using the stride tables, the long input key can be compared to verify the lookup result. Thus the strides are taken from the hashed key rather than from the longer input key. Only 1 or 2 discriminate bits need to be read from the long key to resolve the lookup result.

While hashing is useful for reducing the number of stride bits that must be looked up, hashing may produce aliasing, where two or more input keys produce the same hashed key. The two long keys are said to collide when they share the same hashed key. Such collisions may be resolved by finding discriminate bits in the long keys. A discriminate bit differs for the two long keys—the discriminate bit is a 0 for one long key, and a 1 for the other long key that collide.

The size of the hashed key can be selected to reduce the probability of collisions to a desired level. For example, for a data set of 1 million entries, a 48-bit hash key may reduce the probability of collisions between keys so that no more than 2 input keys are likely to collide in a particular bucket, or value of the hashed key. Having 3 keys collide into a single bucket may be probable when a smaller 44-bit hashed key is used. The probability may be an acceptable value for a particular system, such as a probability of less than $10^{-12}$ that a collision of more than 3 would occur.

Figure 4:
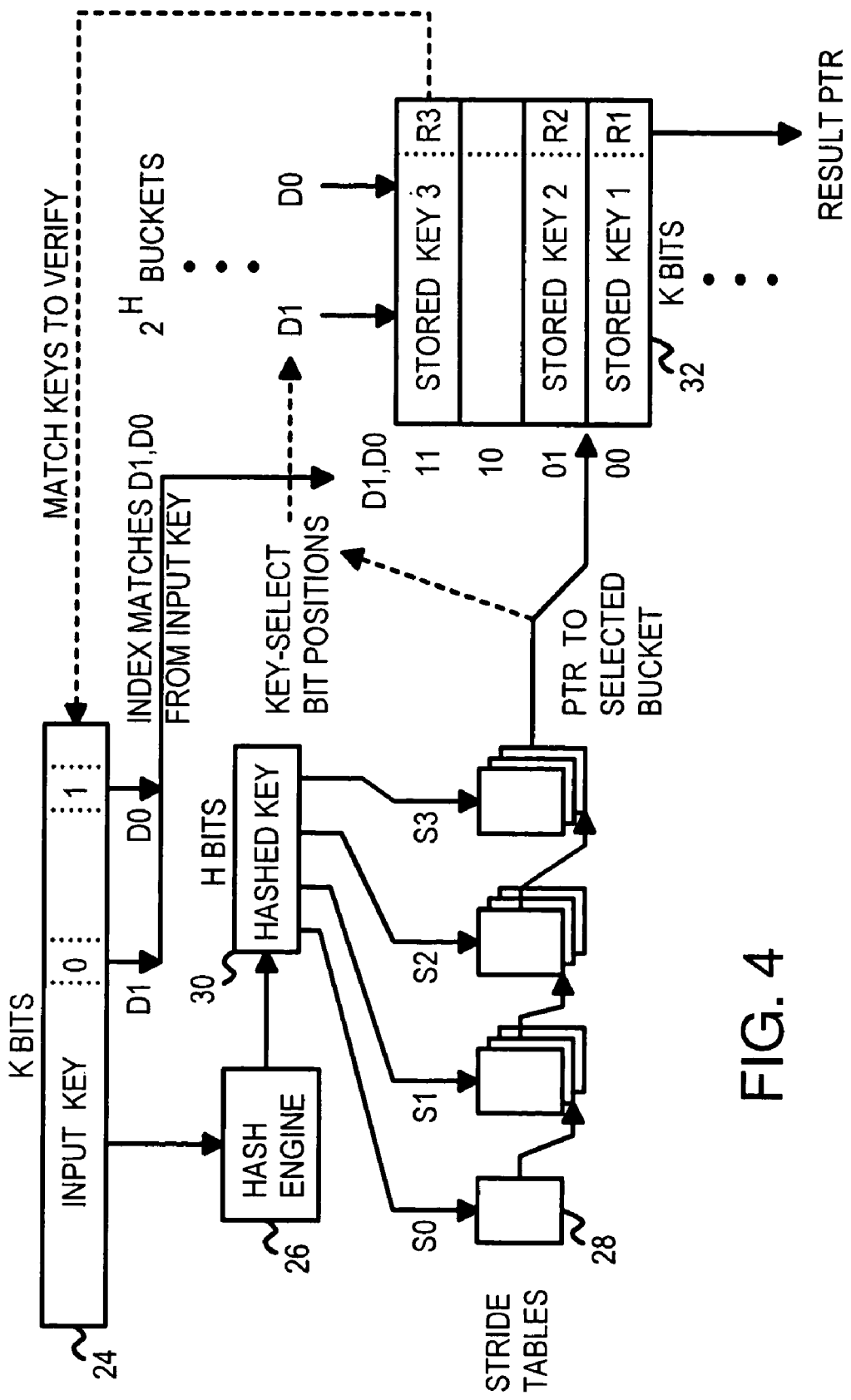
FIG. 4 shows using a hashed key for multi-stride lookup, with discriminate bits from the long input keys used to resolve collisions.

FIG. 4 shows using a hashed key for multi-stride lookup, with discriminate bits from the long input keys used to resolve collisions. Input key 24 is the lookup key that is input to the table structure. A lookup is an operation to find an entry in the table structure that matches key 24. Unfortunately, input key 24 is quite long, having K bits, where K could be 500 bits in some applications. While input key 24 could be divided into strides as was done for key 18 in FIG. 1, this would result in many, many strides, or very wide strides.

Instead, hash engine 26 performs a hash function on input key 24, such as a cyclical-redundancy-check (CRC), MD5, or other function. Hash engine 26 compresses the K bits in input key 24 to generate H bits in hashed key 30. For example, K=500 bits in input key 24 could be reduced to H=48 bits in hashed key 30. Hashed key 30 is a digest of the K bits in input key 24, but may produce collisions of two or more values of input key 24.

In this example, the size H of hashed key 30 is selected so that the probability of a collision of more than 3 values of input key 24 is close enough to zero to be acceptable for the system being designed. Thus each value of hashed key 30 (known as a bucket) can match no more than 3 input keys 24. Each value of hashed key 30 maps to one bucket 32 out of a total of $2^H$ possible buckets. Each bucket 32 contains up to 3 stored keys that can match up to 3 values of input key 24. Most buckets 32 have only one stored key, while some have 2 stored keys, and relatively few have 3 stored keys.

The H bits of hashed key 30 are divided into multiple strides S0, S1, S2, ... that become indexes into stride tables 28, in much the same way as key 18 was divided into strides used to lookup entries in stride tables 10, 12, 14, 16 of FIG. 1. However, hashed key 30 rather than input key 24 is used for the stride bits S0, S1, S2, ....

Figure 3:
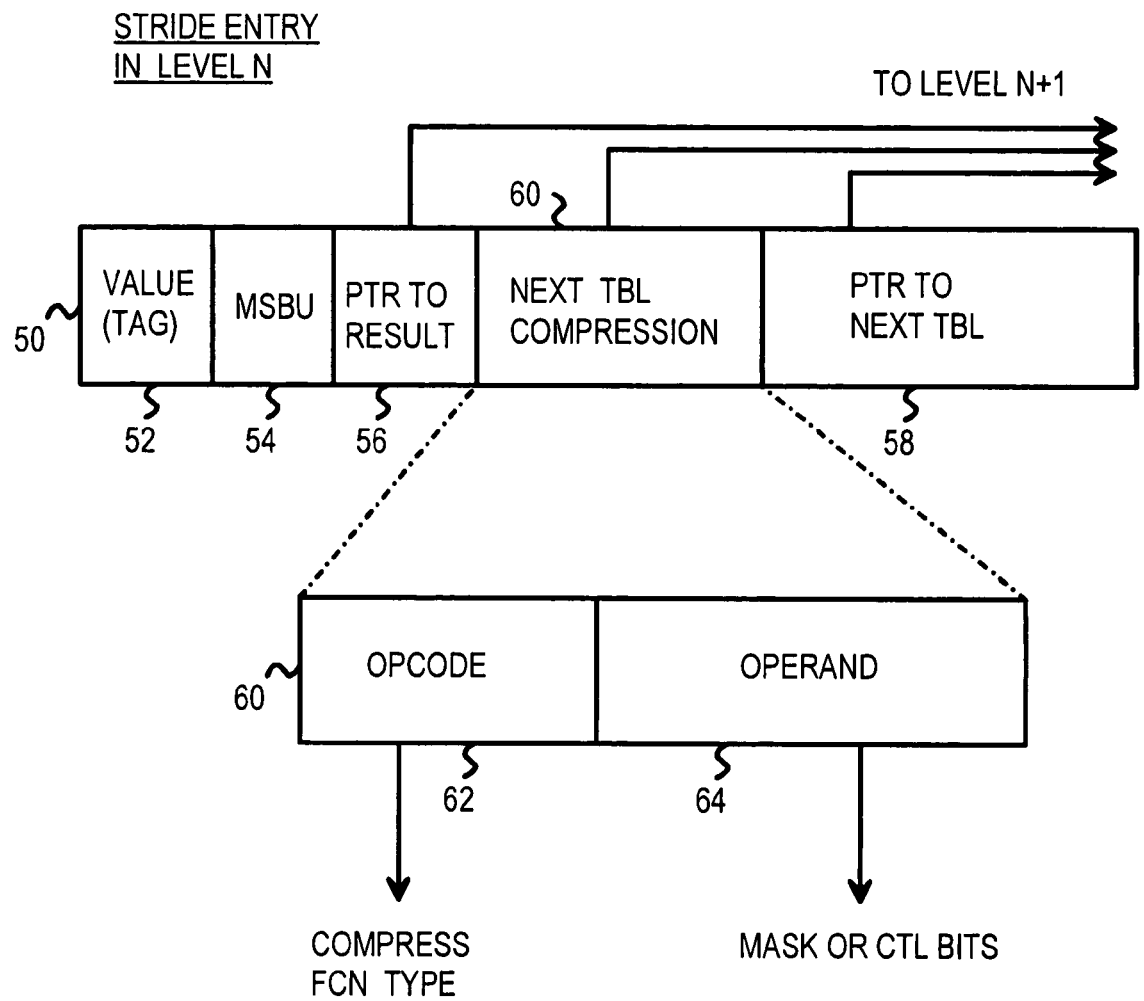
FIG. 3 shows storing of compression functions (CF) in a stride-table entry.

Rather than use the stride bits S0, S1, S2, ... to directly index stride tables 28, a compression function is first performed on the stride bits to form compressed index bits, and then these compressed index bits are used as the index to select entries in stride tables 28. Entries in stride tables 28 can have the formats shown in FIG. 3 or later in FIG. 5 that specify the compression functions (CF) used in the next level of stride tables 28, as well as pointers to next-level stride tables 28.

The final-level entry in stride tables 28 selected by compressed bits generated from final stride S3 contains a bucket pointer to the selected bucket, bucket 32. This bucket pointer locates bucket 32 in a larger table of as many as $2^H$ buckets. Bucket 32 can store as many as 3 stored keys. While each of the three stored keys could be read from bucket 32 and compared to input key 24 to find the matching key and its result, this would require many memory accesses, since each stored key is K bits wide, as is input key 24.

Instead of reading all bits in all stored keys in bucket 32, only 1 or 2 discriminate bits are read from each stored key. The discriminate bits have different values in each of the 3 stored keys. The final entry from stride tables 28 contains the bit-positions of two discriminate bits D0, D1 within the K bits of input key 24. These 2 discriminate bits D0, D1 are read from input key 24 at the bit-positions specified, and are used to select one of the three stored keys in bucket 32.

For example, when D1, D0 read from input key 24 are 00, stored key 1 is read, and its result R1 is output as the lookup result when the keys match. When D1, D0 from input key 24 are 01, stored key 2 is read, and its result R2 is output as the lookup result when the keys match. When D1, D0 from input key 24 are 11, stored key 3 is read, and its result R3 is output as the lookup result when the keys match. When D1, D0 from input key 24 are 10, no stored key is valid since this entry is empty or non-existent.

Thus discriminate bits D0, D1 are key-select bits that select one of three stored keys in bucket 32. The matching result is found by reading only 1 entry of K bits using the 2 discriminate bits from input key 24 as an index, rather than reading all four K-bit wide entries in the bucket. Thus the matching entry is found quickly, without reading all 500 or more bits in input key 24.

The selected stored key is read out from bucket 32 and compared to all K bits of input key 24 to verify the lookup results. The result stored in bucket 32 may be a result pointer to the result, rather than the result itself. Reading all K bits of input key 24 for verification can be done in parallel with locating the result using the result pointer, reducing lookup time.

While bucket 32 has four slots for four stored keys when 2 discriminant bits are used, only 3 keys may be stored. Four long keys may not have 2 bit-positions that have different values for all four keys. However, three long keys always have 2 bit-positions with different values, since one bit-position can distinguish between two of the keys, and the other bit-position can distinguish between the third key and the other two keys.

Figure 5:
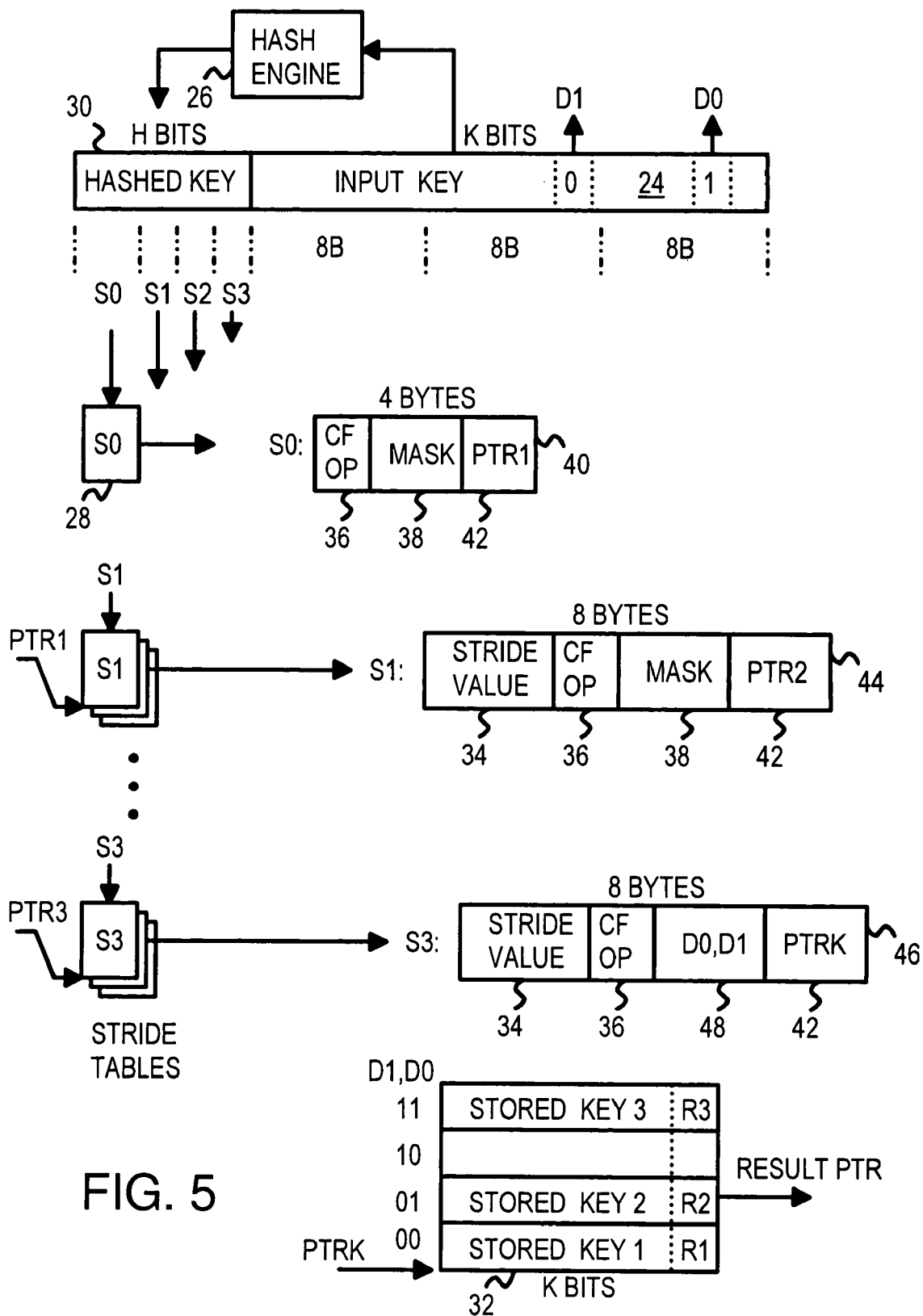
FIG. 5 shows formats of entries in stride tables.

FIG. 5 shows formats of entries in stride tables. Hash engine 26 generates hashed key 30 from input key 24. Hashed key 30 may be considered to be pre-pended to input key 24, since lookup is performed first on hashed key 30, which is divided into strides S0, S1, S2, .... Hashed key 30 may be read out during verification as 8-byte units, which may require 8 or more 64-bit memory reads for K>=500.

The width of the initial stride S0 is often made large since the first level is directly indexed, so as to minimize downstream tables. The first-level entry size can be as small as possible since the s0 bits do not have to be matched. S0 may be larger than other strides S1, S2, S3, such as 12 bits for S0 and 8 bits for other strides. To compensate for the large number of entries in the first stride table, causes by the wider S0, the first level table can have fewer bytes per entry than other strides. For example, entries for first-level S0 of stride tables 28 can have 4 bytes, while entries for other levels of stride tables 28 can have 8 bytes per entry.

First-level entry 40 is directly indexed by first stride S0, without any compression. The entry selected by bits S0 from hashed key 30 includes compression-function operand 36 which specifies which type of compression function to use for the next stride bits S1. Mask field 38 can store a mask, such as an initial mask that selects some of the S1 bits to apply to the compression function, and/or a final mask that selects which bits to include in the final compressed index bits from the bits generated by the compression function and/or the uncompressed index bits. Pointer 42 is a pointer PTR1 to one of several tables in the next-level of stride tables 28, corresponding to one of tables 12, 12' of FIG. 1.

The compression function specified by compression-function operand 36 in entry 40 is applied to next stride bits S1 from hashed key 30, and mask field 38 selects which of the compressed and uncompressed bits to include in the compressed index. The compressed index selects one entry within the second-level table pointed to by pointer 42, PTR1.

Second-level entry 44, selected by the compressed S1 bits, also contains compression-function operand 36, mask field 38, and pointer 42 for the next level of stride tables 28. Stride value 34 is a tag that must match the stride bits S1 before compression. Stride value 34 is a useful field for eliminating false matches. The width of fields may vary from level to level.

Other levels of stride tables 28 are looked up in a similar fashion until final-level entry 46 in the last level of stride tables 28 is located by last stride S3. Final-level entry 46 also contains stride value 34 as a tag for error-checking against S3. Compression-function operand 36 can indicate when only 1 entry is in the final bucket and D1, D0 do not have to be used. Pointer 42 is a final pointer PTRK to selected bucket 32. Selected bucket 32 may have up to three stored keys in the four slots defined by D1, D0, since up to three keys may collide (have the same value of hashed key 30). One of these three stored keys is selected by discriminant bits from input key 24.

The bit-positions of discriminant bits D1, D0 are encoded by discriminant bit-position field 48. Discriminant bit-position field 48 contains encodings for locating D1, D0 in the K bits of input key 24. For example, for K=576 bits, a pair of 10-bit fields could be used that each specify one of the 576 bit positions. Discriminant bits D1, D0 are read from input key 24 at the bit-positions specified in discriminant bit-position field 48. The two discriminant bits from input key 24 are then an index into the four entries (with up to three stored keys) in selected bucket 32. The result pointer for the selected entry in bucket 32 is then read to find the lookup result.

Figure 6:
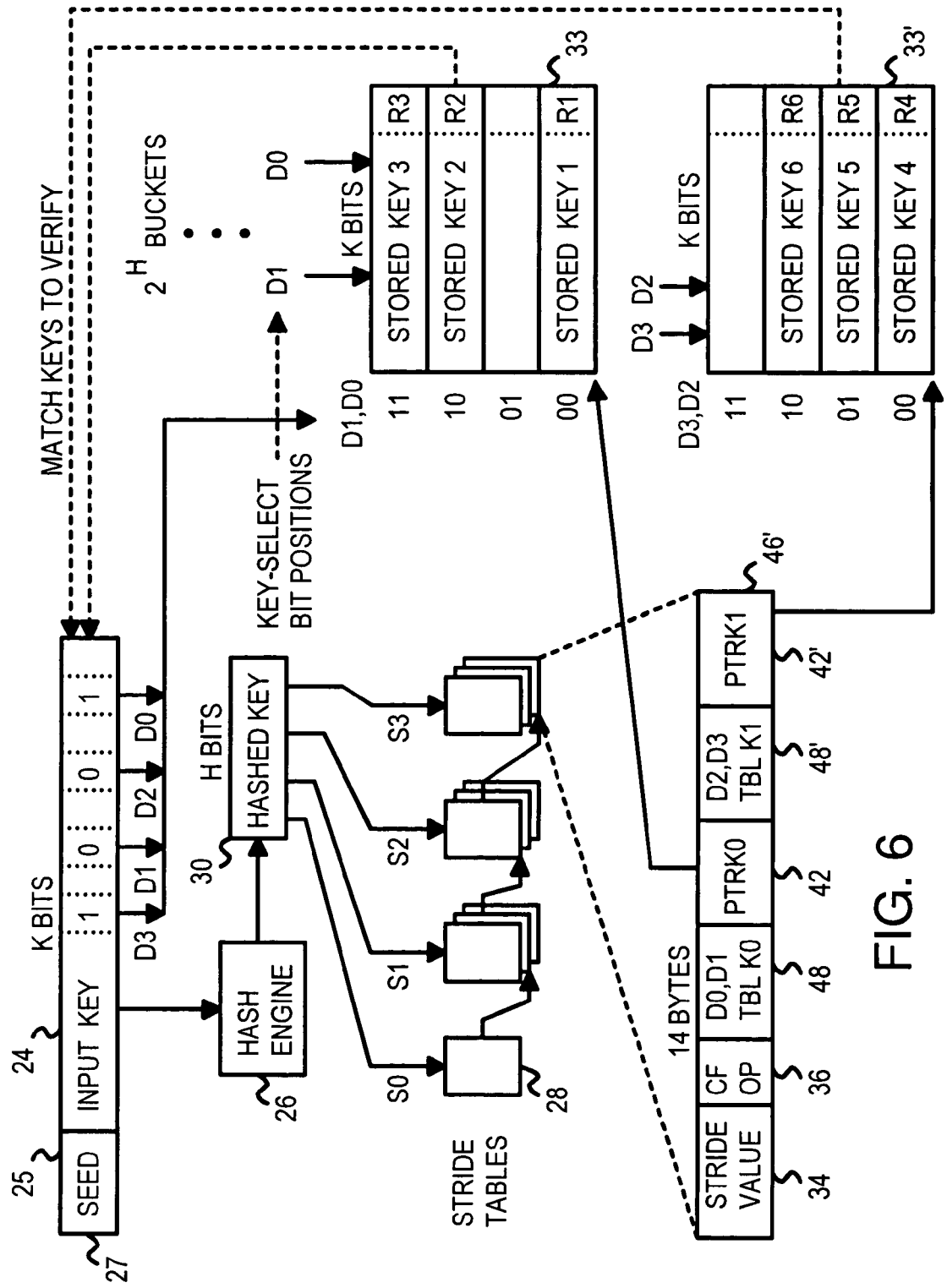
FIG. 6 shows using a hashed key that produces up to 6 collisions per bucket.

FIG. 6 shows using a hashed key that produces up to 6 collisions per bucket. FIG. 6 is similar to FIG. 4, except that more collisions can occur in each bucket in FIG. 6. In FIG. 4, only three collisions could occur per bucket. In FIG. 6, up to six collisions may occur per bucket.

The higher probability of collisions could occur when hashed key 30 is smaller with respect to the total number of entries in the search graph, or when hash engine 26 is less effective (a poorer hash function is used), or when the acceptable probability is lower to have a higher safety margin in the system design (less possibility of failure by exceeding the maximum number of keys in a buckets).

Rather than point to a single selected bucket 32, the final selected bucket is divided into two bucket tables, bucket tables 33, 33'. Together, bucket tables 33, 33' form one of up to $2^H$ buckets that are selected by the H bits of hashed key 30. Each of bucket tables 33, 33' stores up to three stored keys of K bits each, and up to three result pointers in the four slots defined by two discriminant bits. A total of 6 stored keys and their results may be stored for each value of hashed key 30.

Final-level entry 46' is expanded to include two final pointers PTRK0 and PTRK1, stored in two pointer fields, pointer 42, 42'. Pointer PTRK0 points to bucket table 33, while pointer PTRK1 points to bucket table 33'.

Final-level entry 46' also contains two discriminant bit-position fields 48, 48', one for each of bucket tables 33, 33'. The two discriminant bits for bucket table 33 are designated D1, D0, while the other two discriminant bits for bucket table 33' are designated D3, D2. Each pair of discriminant bits read from input key 24 form an index into one of bucket tables 33, 33'.

While larger bucket tables 33, 33' with more entries could be used, more than 2 discriminant bits would be needed per bucket tables 33, 33'. For large keys it is more practical to find 2 discriminant bit-positions in 2 long keys: search for the first bit-position (D0) that has a 1 in the first key and a 0 in the second key, then repeat for the first and third keys to find D1. However, when there are more keys, computing discriminant bit-positions becomes more complex. Also, a third discriminant bit-position field 48 would be needed, increasing storage requirements. Thus limiting each of bucket tables 33, 33' to two discriminant bits, and three stored keys in four slots is efficient.

A first selected stored key is selected from bucket table 33 by discriminant bits D1, D0, while a second selected stored key is selected from bucket table 33' by discriminant bits D3, D2. Both the first and second selected stored keys are compared to input key 24 to determine which selected stored key matches.

The result pointer for the matching selected stored key is used to locate the lookup result associated with that matching entry. Final-level entry 46' may require 14 bytes, compared with 8 bytes for final-level entry 46 in FIGS. 4-5, however, the number of allowable colliding keys increases from 3 to 6.

For example, discriminant bits D1,D0=10 selects stored key 2 in the third slot of bucket table 33, while discriminant bits D3,D2=01 selects stored key 5 in the third slot of bucket table 33'. If stored key 5 matches input key 24, but stored key 2 does not match, then result pointer R5 is used to locate the lookup result.

When more than 6 collisions are supported, additional bucket tables 33, 33' could be provided, such as 3 bucket tables 33, 33', 33'' (not shown) for 9 collisions, etc. An additional discriminant bit-position field 48 for two more discriminant bit-positions, and an additional pointer 42 are stored in final-level entry 46' for each additional bucket table 33.

Random Seed for Improved Reliability

A seed value such as generated by a random number generator can be attached to all input key values before hashing. Seed 25 has the same value for all key values. Seed 25 can be pre-pended to each input key 24 to form seeded input key 27. Seeded input key 27 is then input to hash engine 26 to generate hashed key 30.

Seed 25 is especially useful for securing a database of keys in stride tables, since the values of input keys are hidden by the combination with seed 25 before hashing. Hacking of the hash routine used by hash engine 26 is more difficult since the value of seed 25 is not known to the hacker.

Seed 25 is also useful for recovering from system failures. The probability that more than 3 (FIG. 4) or 6 (FIG. 6) keys collide is below a design threshold. However, the probability of an over-limit collision is still non-zero. Over long periods of time, such as 5 years, 4 (or 7) keys could collide after enough entries have been cycled through the search graph. When such an unlikely over-limit collision does occur, the value of seed 25 could be changed, and the stride tables reconstructed using this new seed value. Since seed 25 is pre-pended to all keys before hashing, different hashed keys 30 result when seed 25 is changed. The case of 4 or 7 collisions is treated as a software error condition that produces a soft-reset of the graph. The over-limit collision is not likely to occur with a different value of seed 25. Thus error recovery is provided by seed 25.

Fragmentation-Free Memory Management—FIGS. 7-10

Figure 7:
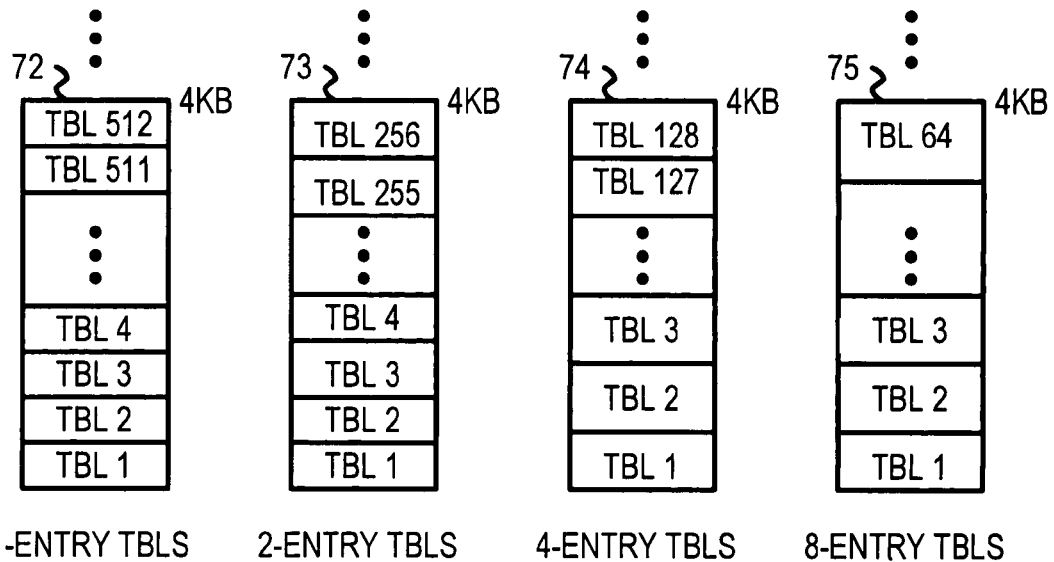
FIG. 7 shows allocation pages that store stride tables of various sizes.
Figure 7:
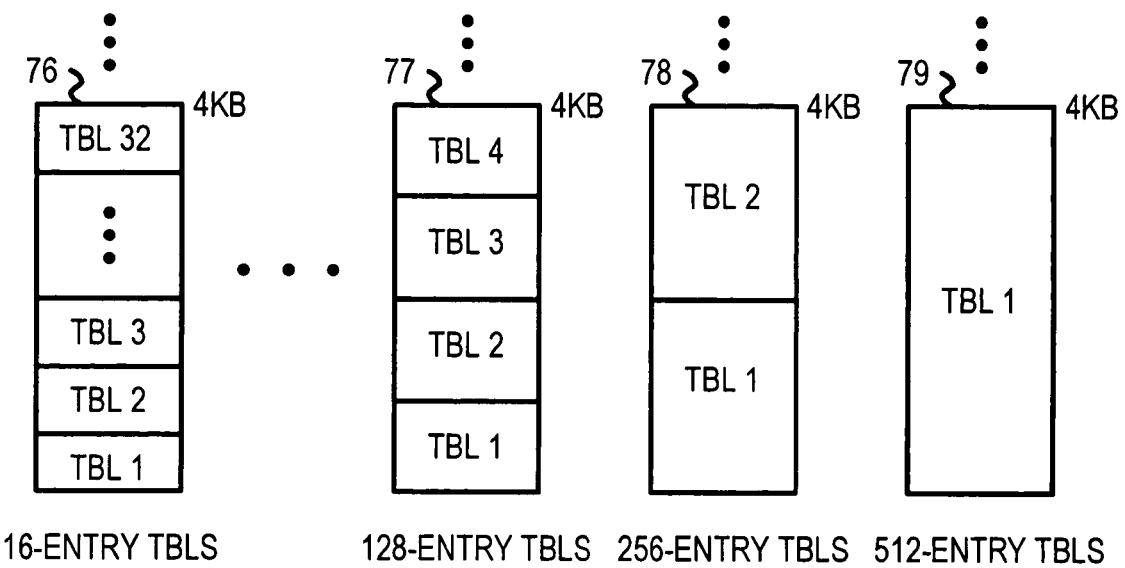

FIG. 7 shows allocation pages that store stride tables of various sizes. There are many individual tables in stride tables 28 (FIG. 5), as shown in FIG. 1. However, rather than have fixed-size tables, compression is used to reduce the size of these tables. The effectiveness of compression varies from table to table; thus many different sizes of tables are present, while the prior art of FIG. 1 may have just one or two sizes when the strides have only one or two bit-widths.

At each level of stride tables, tables of one size are stored together in one or more pages, while tables of another size are stored together in another page. In FIG. 7, tables with only one entry are stored together in page 72. When entries are 8 bytes, and memory pages are 4K bytes, page 72 can store 512 1-entry tables. Other pages 72 can be allocated when there are more than 512 1-entry tables.

Two-entry-tables allocation page 73 stores up to 256 tables per 4 KB page in memory, when the tables have 2 entries of 8 bytes per entry. Four-entry-tables allocation page 74 stores up to 128 tables per 4 KB page in memory, when the tables have 4 entries of 8 bytes per entry. Eight-entry-tables allocation page 75 stores up to 64 tables per 4 KB page in memory, when the tables have 8 entries of 8 bytes per entry. Sixteen-entry-tables allocation page 76 stores up to 32 tables per 4 KB page in memory, when the tables have 16 entries of 8 bytes per entry.

There are also allocation pages for 32-entry tables and 64-entry tables (not shown).

Allocation page 77 stores up to 4 tables per 4 KB page in memory, when the tables have 128 entries of 8 bytes per entry. Allocation page 78 stores 0, 1, or 2 tables per 4 KB page in memory, when the tables have 256 entries of 8 bytes per entry. Page 79 stores only 1 512-entry table per 4 KB page in memory.

Figure 9:
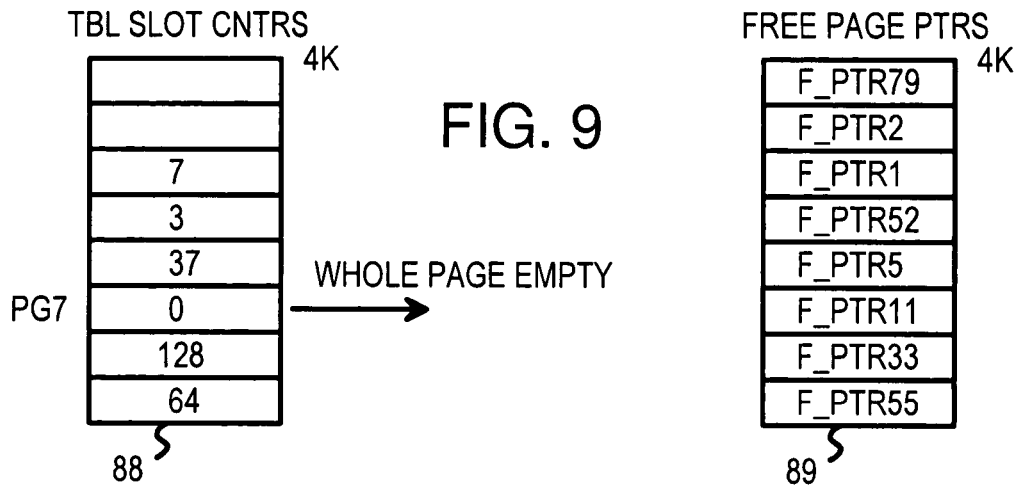
FIG. 9 shows bookkeeping pages.

Some of the allocation pages may be used for bookkeeping or memory-management functions rather than for stride table allocation, such as page 79. For example, FIG. 9 shows slot counters stored in slot-counter page 88, and free page pointers stored in free pointer page 89. Various other pointers and management data structures may be present. The first few slot-counters (in this example 2) in slot-counter page 88 may be for bookkeeping or overhead pages rather than search-graph data pages.

Allocation pages for one stride level could be placed in one physical bank of memory, while allocation pages for another stride level are placed in another physical bank of memory. This may allow for faster accesses when traversing multiple levels of stride tables. Alternately, data striping or interleaving could be used, or tables for multiple stride levels could be stored together in a same physical bank of memory.

Figure 8:
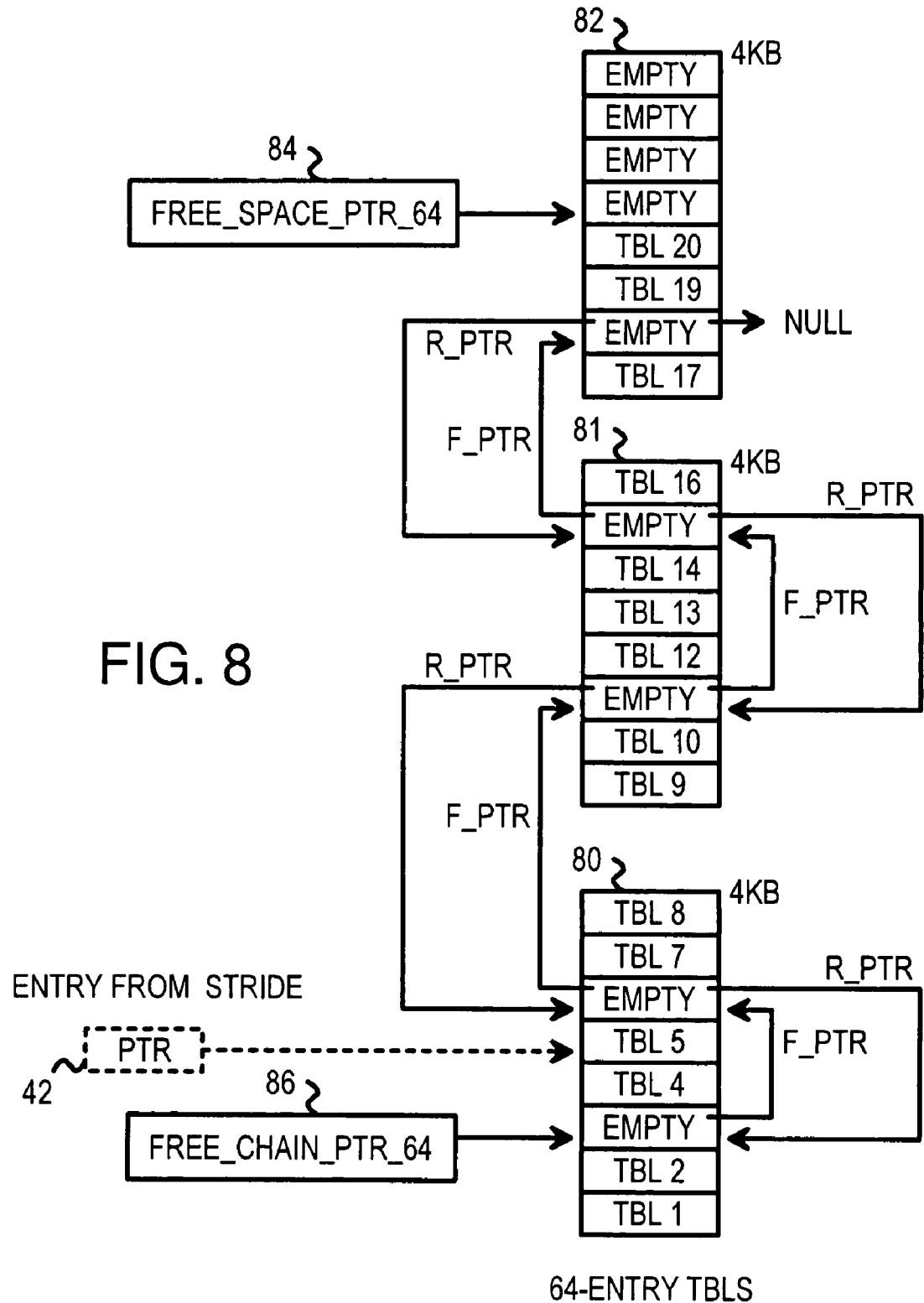
FIG. 8 shows bi-directional chains of free tables in allocation pages.

FIG. 8 shows bi-directional chains of free tables in allocation pages. Tables within allocation pages 80, 81, 82 for 64-entry tables are normally located during lookup operations by pointer 42 (FIGS. 5-6) from the prior-level stride table's selected entry.

As new keys are added and stored, new entries may be added to various levels of the stride tables. The stride tables may increase in size as entries are added. When keys are removed, stride tables have fewer entries and may shrink. A 32-entry stride table may become a 64-entry stride table as keys are added, while a 4-entry stride table may become a 2-entry table or a 1-entry table as entries are removed.

As a stride table changes in size, it is moved to the allocation page for that new table size. FIG. 7 showed different allocation pages for different table sizes. The old location of the enlarged stride table becomes empty. An empty table slot in the allocation page for the old table size is thus created.

When a table changes in size, it can be moved to an empty table slot in the allocation page for its new table size. Free space pointer 84 is a pointer to the first empty table slot in a range of empty, never-allocated table slots at the top of allocation page 82. The table could be loaded into this empty slot, and free space pointer 84 moved up by the table size. Once the last empty slot is allocated, a new empty allocation page can be allocated to this table size.

The changed table could also be allocated to an empty table slot that was vacated by another table that was moved earlier. A bi-directional chain of these empty table slots is maintained, known as a free chain. Free chain pointer 86 points to the first empty slot in this chain, slot 3 in page 80. This empty slot contains a forward pointer F_PTR to the next free slot in the chain, slot 6 in this same page 80. Slot 6 contains a reverse pointer R_PTR back to slot 3, and a forward pointer F_PTR to slot 11 in page 81. Empty slot 18 in page 81 is linked by forward and reverse pointers in s similar way, until the final slot in the free chain, slot 18 in page 82, is reached. Slot 18 has a reverse pointer but no forward pointer, or a value of null (or some other pre-defined end-of-chain value) for its forward pointer.

Each table size can have its own free space pointer 84 and its own free chain pointer 86. The 64-entry pointers are shown in FIG. 8. Pointers 84, 86 could be hardware registers or could be stored in a bookkeeping page in memory.

FIG. 9 shows bookkeeping pages. A count of the allocated slots in each allocation page is kept and stored in slot-counter page 88. As tables are de-allocated, creating empty slots, this count is reduced, until its slot-counter reaches zero, triggering the page-reclaim operation and indicating that there are no tables in that allocation page. The page is completely empty. In this case the whole page can be replaced back into the free pointer list (FIG. 9).

In this example, page 7 has a slot counter of zero. Page 7 is empty and can be de-allocated and later used for another purpose. Scanning slot-counter page 88 for zero-valued counters can quickly locate pages that can be de-allocated, without having to traverse free chains shown in FIG. 8. Once de-allocated, a pointer to the page is listed in free-pointer page 89.

Figure 10A:
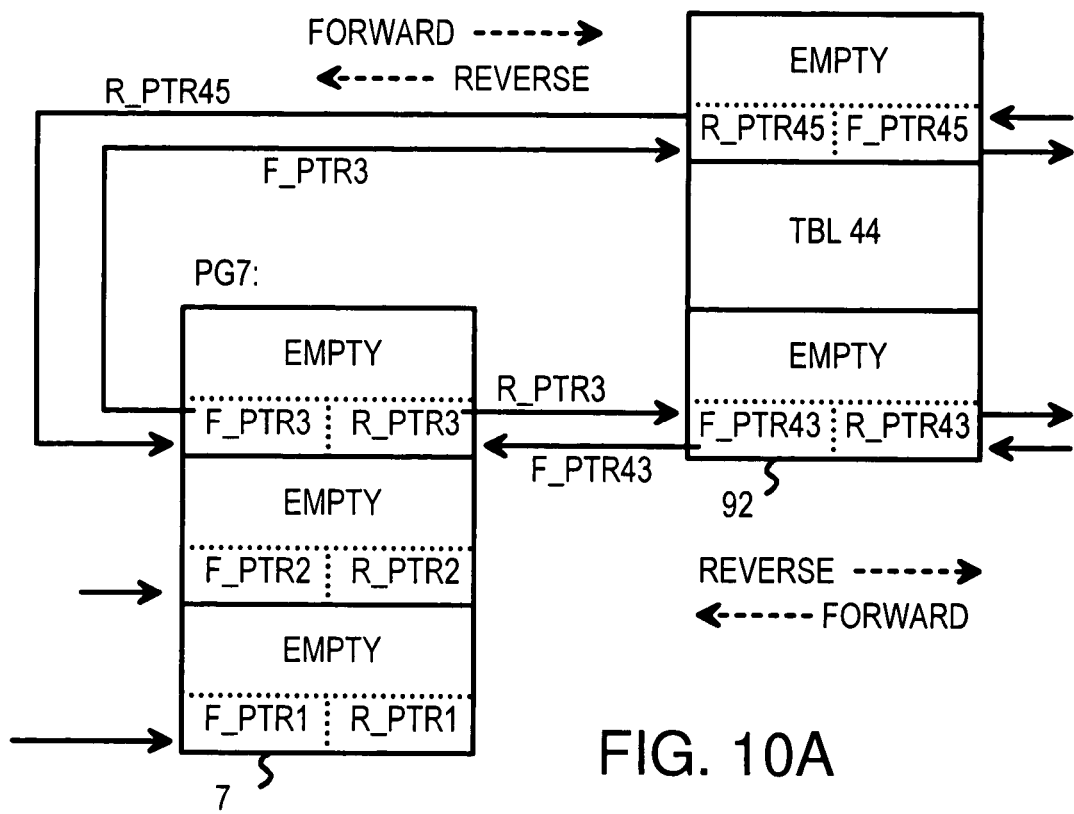
FIGS. 10A-C highlight removing an empty slot from the free chain to de-allocate an empty page.
Figure 10B:
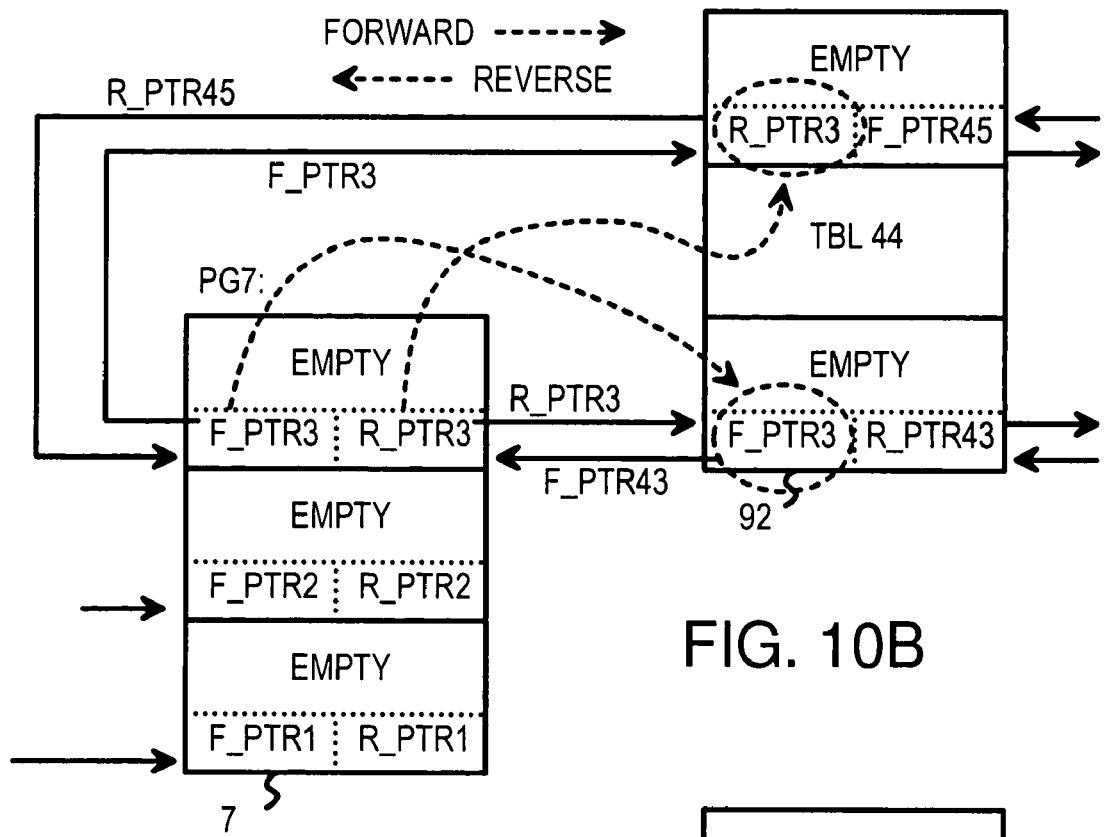
Figure 10C:
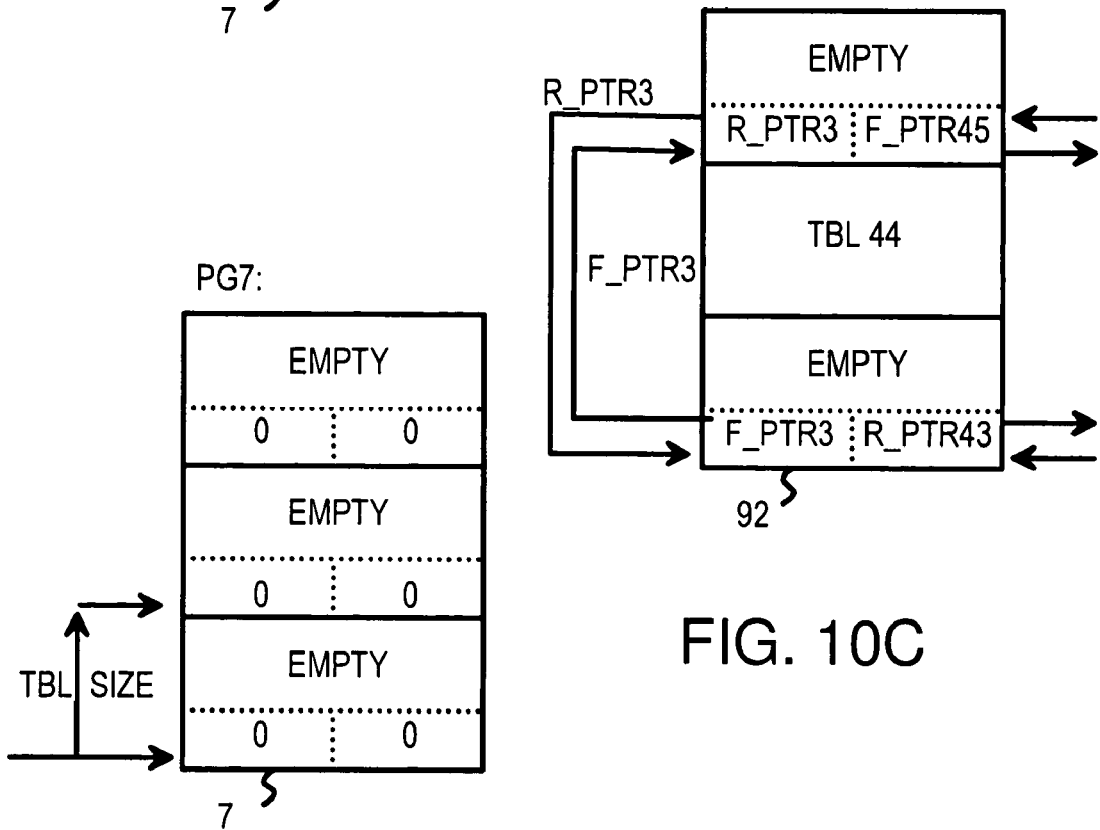

FIGS. 10A-C highlight removing an empty slot from the free chain to de-allocate an empty page. Page 7 has a slot counter value of 0 in slot-counter page 88 (FIG. 9) and can be de-allocated. However, the free chain includes slots in page 7.

In FIG. 10A, empty slot 3 in page 7 has a forward pointer F_PTR3 to slot 45 in page 92, and a reverse pointer R_PTR3 to slot 43 in page 92. Slots 1, 2 of page 7 have already been unlinked from free chains; only slot 3 remains to be unlinked.

In FIG. 10B, the reverse pointer in slot 3, R_PTR3, over-writes the reverse pointer that points to slot 3, R_PTR45 in slot 45. The forward pointer in slot 3, F_PTR3, over-writes the forward pointer that points to slot 3, F_PTR43 in slot 43.

In FIG. 10C, after the reverse and forward pointers from slot 3 have been copied, slot 43 now points forward to slot 45, skipping slot 3. Slot 45 points in reverse to slot 53, skipping slot 3. Slot 3 in page 7 has been removed from the free chain.

Each empty slot in page 7 can be unlinked in a similar fashion. The next slot and its forward and reverse pointers in page 7 are located by jumping by the table size. Once all slots in page 7 have been unlinked, page 7 can be de-allocated.

Fast-Updating Deterministic Hash-Based Lookup Structure—FIGS. 11-14

Some applications require both fast lookups and fast updates of stored key entries. In the prior embodiments, there may be many stride tables of different sizes. As keys are added or removed, table sizes may change, and the tables may be re-located to other allocation pages. Existing keys may have to be re-located, requiring copy operations. This relocation of tables is somewhat slow, as many long stored keys and their entries may need to be copied to new memory locations. Multiple memory reads are required during lookups to read the many levels of stride tables. These multiple memory reads of multiple table levels is also somewhat slow for certain applications.

The inventor has realized that a variation of the hashed-key stride tables that use discriminant bits to locate long keys may be ideally suited for lookup tables with fast update rates, such as can be achieved by fast hardware-based CAMs. A CAM is a content-addressable memory that is often based on a hardware chip that has CAM memory cells. The CAM memory cells can rapidly compare input data to stored data using compare hardware that is built into the CAM cells themselves. Thus very high speed compares and updates are possible.

In this scheme, as new keys are placed into empty slots in the storage (memory), there is no need to relocate other keys that are already stored in the table. By not relocating existing keys, the number of bytes to copy can be drastically reduced when new key entries are allocated.

In order to keep memory management simple and high in performance, in this scheme a sufficiently wide hash key is used to reduce the probability of more than two collisions to near zero, as opposed to the earlier scheme of near-zero probability for 3 or 6 collisions. For a system with a total number T entries, T contiguous key locations are reserved in memory, and the initial stride table size is limited to size T.

As the initial stride of S0 bits is consumed, the probability of having more than N collisions in one of the T buckets is close to zero. The stride size S0 is related to the number of buckets at the first level hash table as $S0=\log_2(T)$.

At the next level, the number of bits in the next stride, S1, is chosen so that the probability of N/2 collisions is close to zero. The S1 bits have reduced the number of collisions by half. A third level can have S2 stride bits, where S2 is chosen to achieve the same near-zero probability of N/4 collisions. Thus the number of possible collisions is reduced by half for each additional level.

Figure 11:
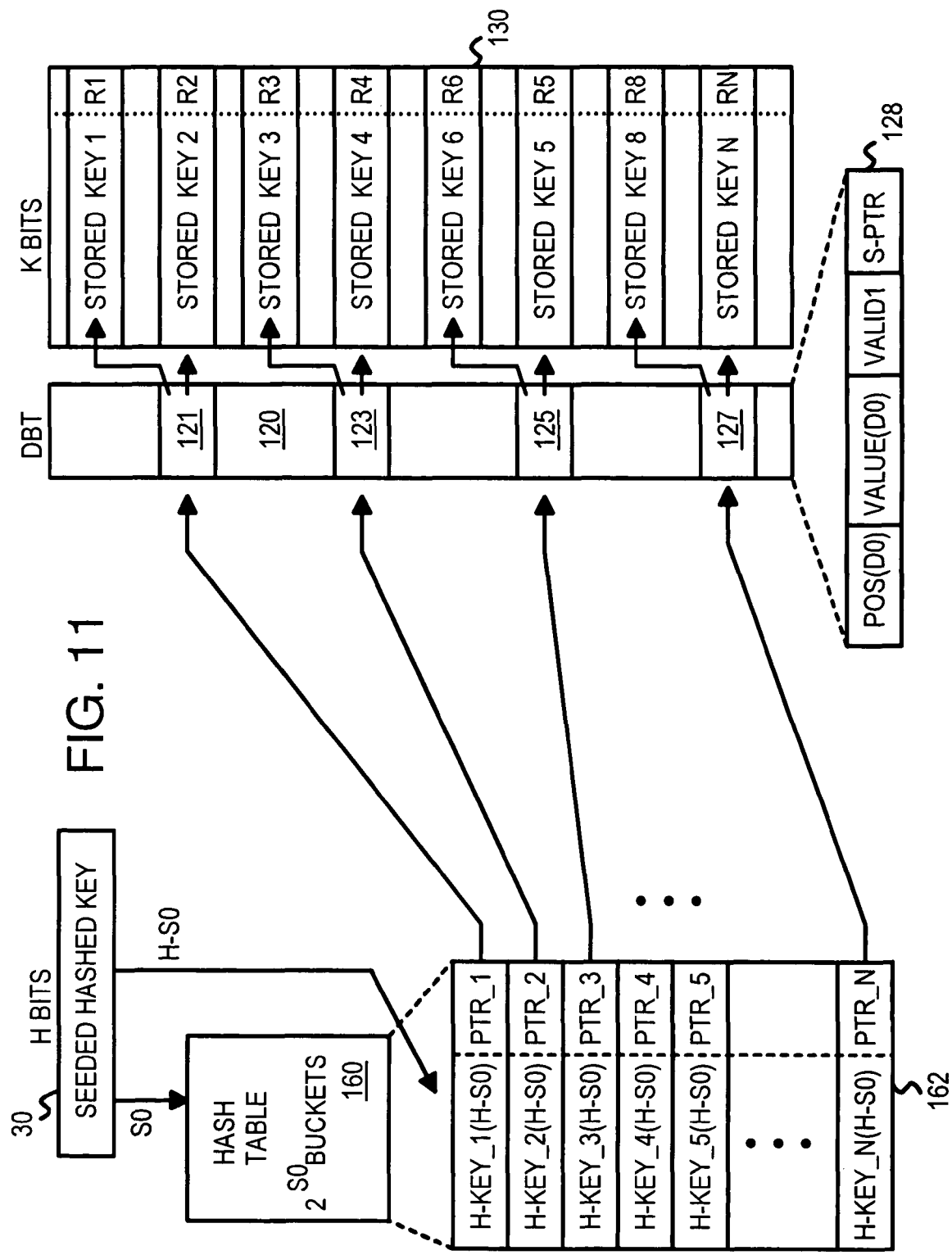
FIG. 11 shows a single-level hashed lookup table can be used to achieve fast lookups and updates that can mimic a hardware CAM.

FIG. 11 shows a single-level hashed lookup table can be used to achieve fast lookups and updates that can mimic a hardware CAM. The initial stride S0 of hashed key 30 is set to a large number of bits that determines the number of entries $2^{S0}$ in a hash table. H is the number of hashed bits in hashed key 30, which is generated from input key 24 (and optionally also from pre-pended seed 25) using hash engine 26 as described earlier for FIGS. 4, 6. Seed 25 can be pre-pended to the input key to generate seeded hashed key 30. A smaller memory of only 1K entries could use H=32 and still achieve a>2 collision probability of $10^{-10}$.

Initial stride bits S0 form an index into hash table 160, which has $2^{S0}$ entries. A matching entry is found quickly, since hash table 160 is direct-mapped and can be a simple RAM. Each of the $2^{S0}$ entries in hash table 160 is a bucket. Each bucket has $N=2^{H-S0}$ hash entries.

The remaining H-S0 bits of hashed key 30 are stored as stored keys in hash-table bucket entry 162. Up to N stored keys and their pointers are stored in each hash-table bucket entry 162. The entire H bits of hashed key 30 could be stored for each of the N stored keys, or only the H-S0 bits of hashed key 30 as shown.

The number of bits H of hashed key 30 is chosen so that there is still a probability of up to 2 values of input key 24 colliding in the same hash value. However, the probability of more than 2 values of input key 24 colliding into the same H-bit hash value is close to zero. The closeness to zero can be a design parameter that depends on the desired reliability or time to failure (>2 collision occurring) of the system.

In general, there is a near-zero probability of more than N values of input key 24 colliding in one hash-table bucket entry 162. Each stored hash value and pointer in hash-table bucket entry 162 points to one entry in discriminant bit table (DBT) 120, which can point to one of two stored keys in key table 130. Thus a total of N stored keys may be associated with each of the $2^{S0}$ hash-table bucket entries 162 in hash table 160.

Each of DBT entries 121, 123, 125, 127 has the format shown in DBT entry 128. DBT entry 128 in discriminant bit table 120 includes a discriminant bit-position field POS(D0) which encodes which of the K bit positions in input key 24 contains the discriminant bit that determines which of the two stored keys to select. A value field VALUE(D0) indicates the logic value (0 or 1) of D0 that selects the primary key, while the inverse logic value of D0 selects the secondary key. The primary key is stored at the same index in key table 130 as the index of DBT entry 128 in discriminant bit table 120, while the secondary key may be stored in any location in key table 130. Secondary pointer S-PTR is a pointer to the secondary key stored in key table 130. A valid field VALID1 in DBT entry 128 indicates when the primary key is valid. A null secondary pointer S-PTR can indicate that the secondary key is invalid. Thus either the primary or the secondary key can be easily invalidated.

DBT entry 121, pointed to by hash key 1, can access stored key 2 as its primary key, or stored key 1 as its secondary key. DBT entry 123, pointed to by hash key 3, can access stored key 4 as its primary key, or stored key 3 as its secondary key.

DBT entry 125, pointed to by hash key 3, can access stored key 4 as its primary key, or stored key 3 as its secondary key. When bits H-S0 if hashed key 30 match the stored hash key 3 in hash-table bucket entry 162, then pointer PTR_3 from hash-table bucket entry 162 locates DBT entry 125 in discriminant bit table 120. Entry 125 has an implied primary pointer to the same index (straight across) in key table 130 that contains stored key 5 and its result pointer R5. When the discriminant bit D0 read from input key 24 matches the value VALUE(D0) from entry 125, then stored key 5 is read and compared to input key 24 for verification, and result pointer R5 finds the lookup result, assuming valid bit VALID1 is valid. When D0 mismatches VALUE(D0), secondary pointer S-PTR in entry 125 points to the secondary key, stored key 6, which is read and compared to input key 24 for verification, and the lookup result is found using result pointer R6.

Stored keys can be invalidated by clearing their S-PTR or VALID1 valid bits. New keys can be written into key table 130 and secondary pointers or pointers in hash-table bucket entry 162 adjusted to point to the new keys. Stored keys do not have to be moved around, but may remain in place as the pointers are adjusted. Thus updates are fast and efficient. Since only one type of compression function is used with 1 discriminant bit position to resolve the collision, complexity is further reduced.

Storage is minimized since the number of hash-table entries in hash table 160 is kept to $2^{S0}$, yet collisions are resolved quickly and deterministically using the remaining hash bits H-S0 and discriminant bit D0 from the input key. The benefits of a much larger hash table of $2^H$ entries is provided by a hash table of only $2^{S0}$ entries.

Figure 12:
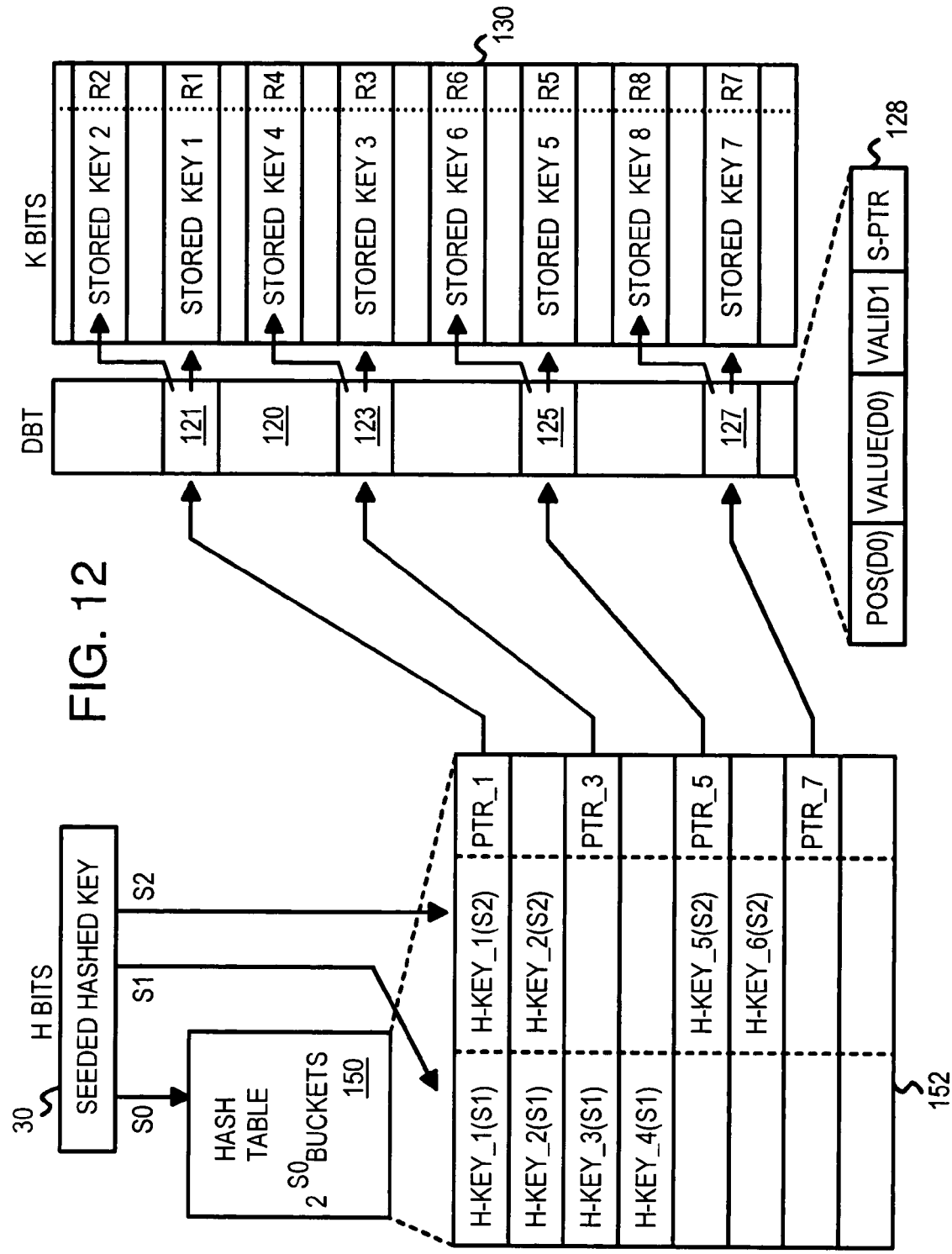
FIG. 12 shows a fast-updating deterministic hash-based lookup structure where 4 keys may collide in each hash-table bucket entry.

FIG. 12 shows a fast-updating deterministic hash-based lookup structure where 8 keys may collide in each hash-table bucket entry. FIG. 12 is an improvement over FIG. 11 since the number of bits that are stored in the hash-table entry is reduced. Storage is reduced by a factor of 2. In this example, the number of hash collisions N is 8, which is the same as the number of possible key collisions, N, or 8. The width H of hashed key 30 is selected so that the probability of more than 2 keys colliding is near zero. The number of entries in hash table 150, $2^{S0}$, is selected based on the desired size of the structure.

The remaining H-S0 bits are divided into multiple strides S1 and S2 having widths of S1 and S2 bits. For each level the possible number of collisions is reduced by 2. At each level, one of two paths can be taken. Keys are explicitly stored for one path, while the other path is a default path that does not require storing hash keys. Each of these paths can be split into another 2 paths at the next level until at the final level only 2 keys may collide.

The inventor has realized that not all of the bits of the hash keys need to be stored in the hash bucket. For N hash keys, only the S0 bits of the first N/2 hash keys need to be stored. For the other N/2 hash keys, the S0-bit portion can simply be treated as the default case. The default case is when the S0 bits are different than the S0 bits for the first N/2 hash keys stored in the hash bucket.

The hash bucket after the S0 bits are consumed can be considered to be divided into 2 sub-buckets. For the first sub-bucket the S0 bits are specified explicitly while for the second sub-bucket the S0 bits are a non-matching "default" case. Similarly each of these two sub-buckets can be further sub-divided into two more sub-sub-buckets. The first sub-sub-bucket has the S0 bits specified explicitly while the second sub-sub-bucket is the "default" case in which the S0 bits do not match.

Each hash-table bucket entry 152 stores four hash-key tags of S1 bits, H_KEY_1(S1), H_KEY_2(S1), H_KEY_3(S1) and H_KEY_4(S1). Each hash-table bucket entry 152 also stores four hash-key tags of S2 bits, H_KEY_1(S1), H_KEY_2(S1), H_KEY_5(S1) and H_KEY_5(S1). Hash-key tags are stored for both S1 and S2 for keys 1 and 2, but only for S1 for keys 3, 4, and only for S2 for keys 5, 6. No hash-key tags are stored for keys 6, 7.

Pointer PTR_1 is taken when both H_KEY_1(S1) and H_KEY_1(S2) match the S1 and S2 bits from hashed key 30, or when both H_KEY_2(S1) and H_KEY_2(S2) match the S1 and S2 bits from hashed key 30. Pointer PTR_1 accesses DBT entry 121. Stored key 1 is selected and verified when the discriminant bit D0 at position POS(D0) read from input key 24 matches the value VALUE(D0) from entry 121, and result pointer R1 finds the lookup result, assuming valid bit VALID1 is valid. When D0 mismatches VALUE(D0), secondary pointer S-PTR in entry 121 points to the secondary key, stored key 2, which is read and compared to input key 24 for verification, and the lookup result is found using result pointer R2.

Pointer PTR_3 is taken when either H_KEY_3(S1) or H_KEY_4(S1) match the S1 bits from hashed key 30. Pointer PTR_3 accesses DBT entry 123. Stored key 3 is selected and verified when the discriminant bit D0 at position POS(D0) read from input key 24 matches the value VALUE(D0) from entry 123, and result pointer R3 finds the lookup result, assuming valid bit VALID1 is valid. When D0 mismatches VALUE(D0), secondary pointer S-PTR in entry 123 points to the secondary key, stored key 4, which is read and compared to input key 24 for verification, and the lookup result is found using result pointer R4.

Pointer PTR_5 is taken when either H_KEY_5(S2) or H_KEY_6(S2) match the S2 bits from hashed key 30. Pointer PTR_5 accesses DBT entry 125. Stored key 5 is selected and verified when the discriminant bit D0 at position POS(D0) read from input key 24 matches the value VALUE(D0) from entry 125, and result pointer R5 finds the lookup result, assuming valid bit VALID1 is valid. When D0 mismatches VALUE(D0), secondary pointer S-PTR in entry 125 points to the secondary key, stored key 6, which is read and compared to input key 24 for verification, and the lookup result is found using result pointer R6.

When none of the above hash-key tag matches occur, the default pointer PTR_7 is taken. The default pointer may point to up to 2 stored keys, so a total of 8 stored keys may share hash-table bucket entry 152, even through only eight partial-width hash-key tags are stored, the equivalent of four full-width hash-key tags.

Default pointer PTR_7 reads DBT entry 127. DBT entry 127 can access stored key 7 as its primary key, and stored key 8 as its secondary key. Seed 25 can be pre-pended to the input key to generate seeded hashed key 30.

When the discriminant bit D0 read from input key 24 matches the value VALUE(D0) from entry 127, then stored key 7 is read and compared to input key 24 for verification, and result pointer R7 finds the lookup result, assuming valid bit VALID1 is valid. When D0 mismatches VALUE(D0), secondary pointer S-PTR in entry 127 points to the secondary key, stored key 8, which is read and compared to input key 24 for verification, and the lookup result is found using result pointer R8.

Figure 13:
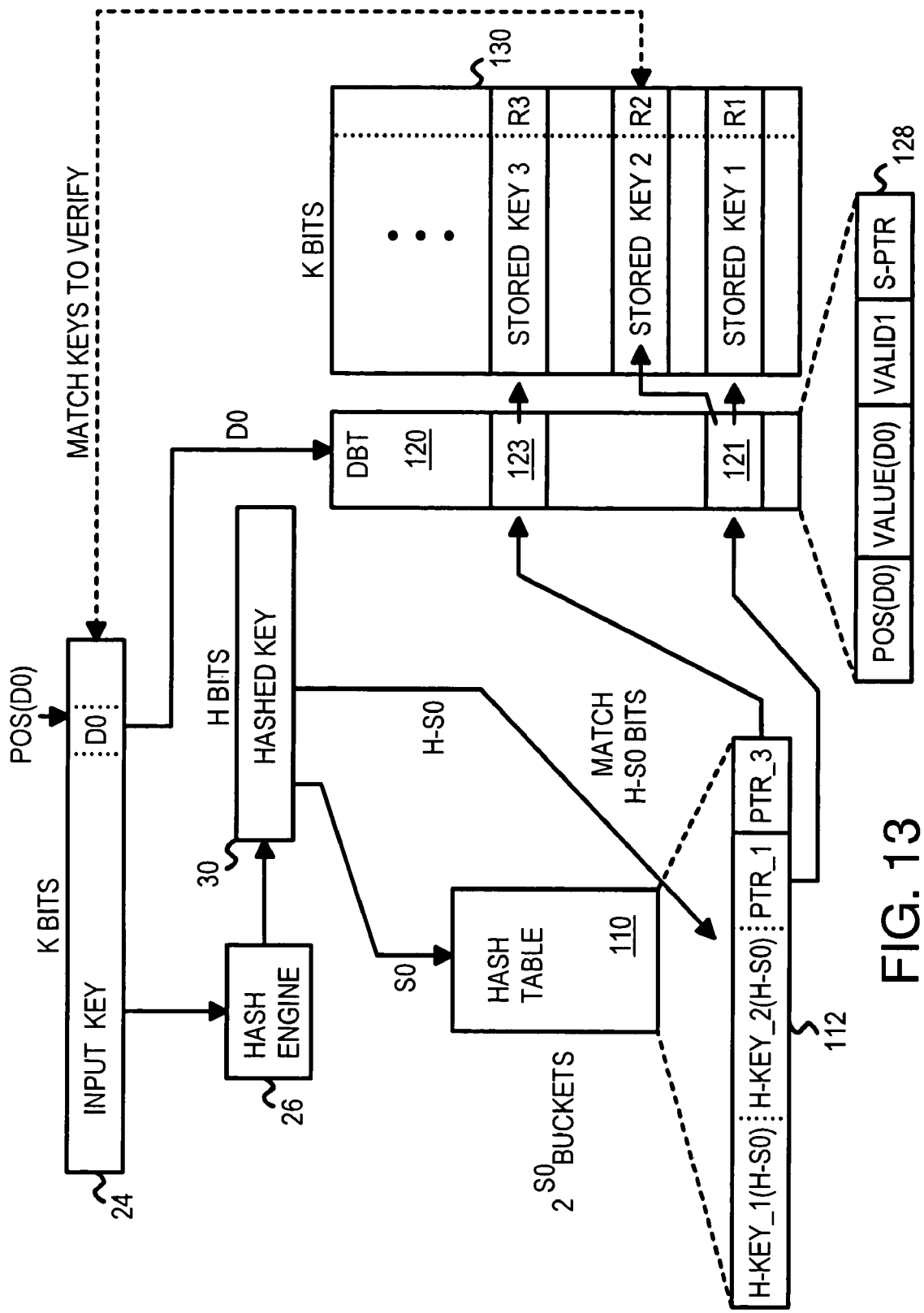
FIG. 13 shows a fast-updating deterministic hash-based lookup structure where 8 keys may collide in each hash-table bucket entry.

FIG. 13 shows a fast-updating deterministic hash-based lookup structure where 4 keys may collide in each hash-table bucket entry. In this specific example of N=4, the number of key collisions is 4. The width H of hashed key 30 is selected so that the probability of more than 2 keys colliding is near zero. The number of entries in hash table 110, $2^{S0}$, is selected based on the desired size of the structure.

Each hash-table bucket entry 112 stores two hash-key tags of H-S0 bits, H_KEY_1 and H_KEY_2. Pointer PTR_1 is taken when either H_KEY_1 and H_KEY_2 matches the remaining H-S0 bits from hashed key 30. When neither H_KEY_1 or H_KEY_2 matches, the default pointer PTR_3 is taken. The default pointer may point to up to 2 stored keys, so a total of 4 stored keys may share hash-table bucket entry 112, even through only two hash-key tags are stored.

When either H_KEY_1 or H_KEY_2 matches, pointer PTR_1 reads DBT entry 121. DBT entry 121 can access stored key 1 as its primary key, or stored key 2 as its secondary key.

When the discriminant bit D0 read from input key 24 matches the value VALUE(D0) from entry 121, then stored key 1 is read and compared to input key 24 for verification, and result pointer R1 finds the lookup result, assuming valid bit VALID1 is valid. When D0 mismatches VALUE(D0), secondary pointer S-PTR in entry 121 points to the secondary key, stored key 1, which is read and compared to input key 24 for verification, and the lookup result is found using result pointer R1.

When neither H_KEY_1 or H_KEY_2 matches, default pointer PTR_3 reads DBT entry 123. DBT entry 123 can access stored key 3 as its primary key, or another stored key (not shown) as its secondary key. In this example, the S-PTR is null in DBT entry 123 to invalidate the secondary key.

When the discriminant bit D0 read from input key 24 matches the value VALUE(D0) from entry 123, then stored key 3 is read and compared to input key 24 for verification, and result pointer R3 finds the lookup result, assuming valid bit VALID1 is valid. When D0 mismatches VALUE(D0), secondary pointer S-PTR in entry 123 points to the secondary key.

Hash key 1 and hash key 2 could be the same value when collisions occur. For example, stored key 1 and stored key 2 in key table 130 could be different keys that still produce the same value of hashed key 30. DBT entry 121 resolves this collision, selecting stored key 1 when the discriminant bit read from input key 24 at bit-position POS(D0) matches VALUE(D0), or selecting stored key 2, pointed to by S-PTR, when D0 has the opposite logic value.

FIGS. 14A-D show free chain updating as keys are invalidated. New primary or secondary keys can be loaded into any free location in key table 130, such as a block of free entries above occupied entries, or at the top of a free chain that is pointed to by top-of-free list pointer 184.

Figure 14A:
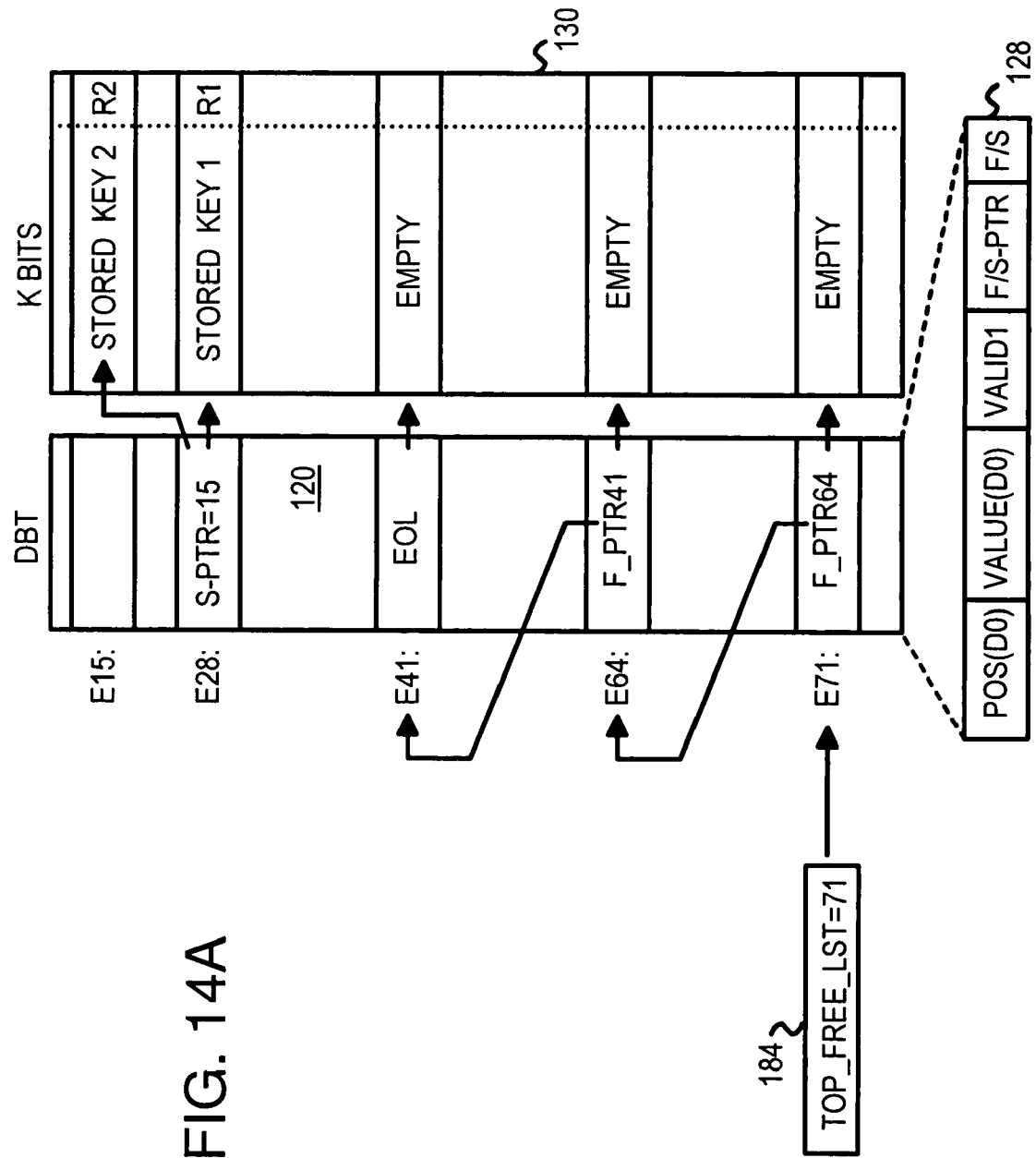
FIGS. 14A-D show free chain updating as keys are invalidated.

In FIG. 14A, top-of-free list pointer 184 points to DBT entry 71 in discriminant bit table 120, which is empty. The secondary pointer field S-PTR in DBT entry 71 contains a free pointer when the DBT entry is free or 'empty'. Free/secondary bit F/S in DBT entry 128 is set to indicate that the S-PTR field contains a free pointer, and cleared when the S-PTR field contains a secondary pointer.

DBT entry 71 contains free pointer F_PTR64 which points to DBT entry 64 as the next free DBT entry. DBT entry 64 contains free pointer F_PTR41 which points to DBT entry 41 as the next free DBT entry. DBT entry 41 contains and end-of-list value for its free pointer to indicate that DBT entry 41 is the end of the free list.

DBT entry 28 is occupied, containing a secondary pointer to stored key 2 in key table 130, and an implied primary pointer to stored key 1 in key table 130 at the same index 28.

Figure 14B:
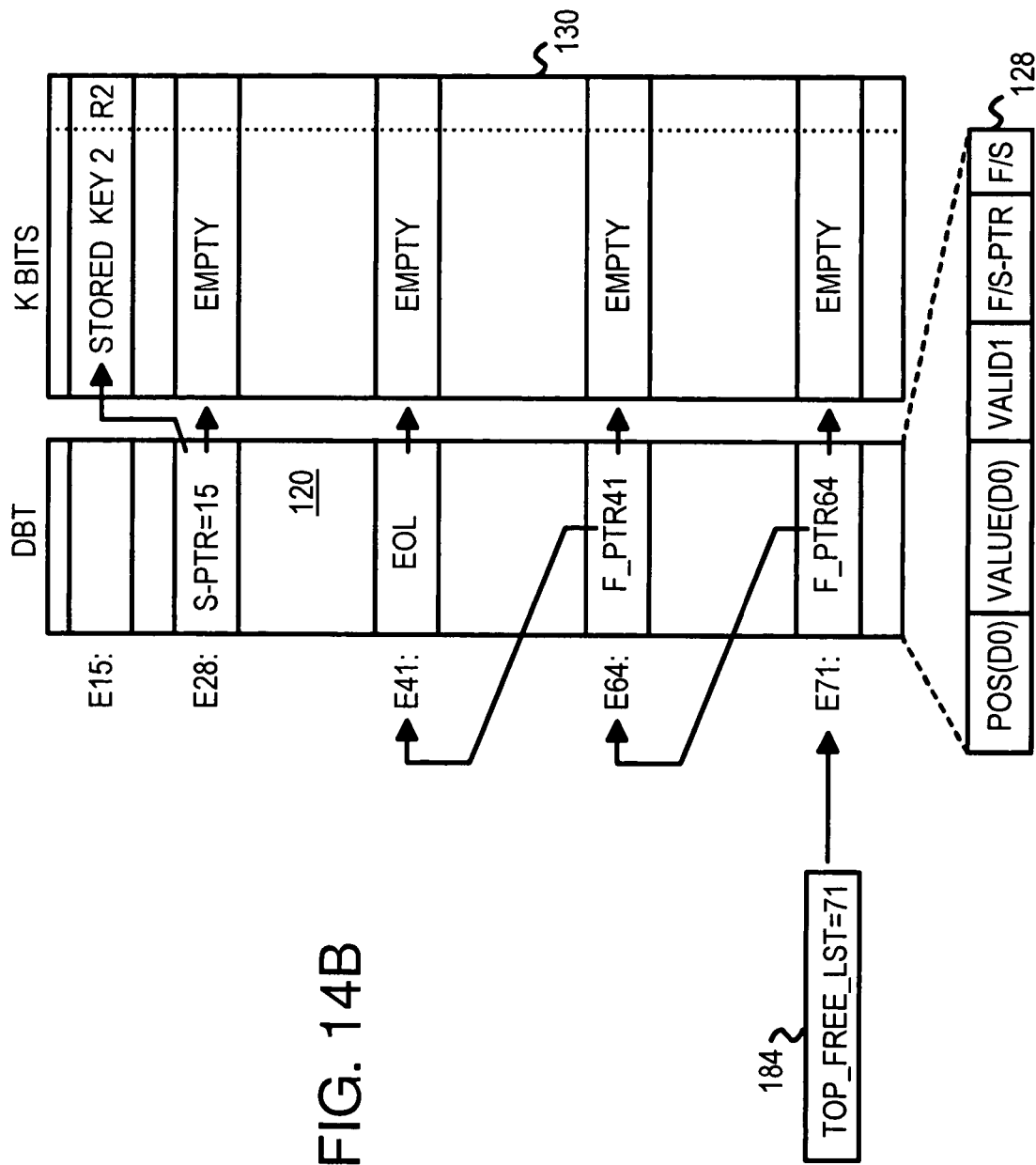

In FIG. 14B, after some time, stored key 1 is invalidated by clearing the VALID1 bit in DBT entry 28. The secondary pointer S-PTR in DBT entry 28 still points to stored key 2 as the secondary key, although no primary key is valid.

Figure 14C:
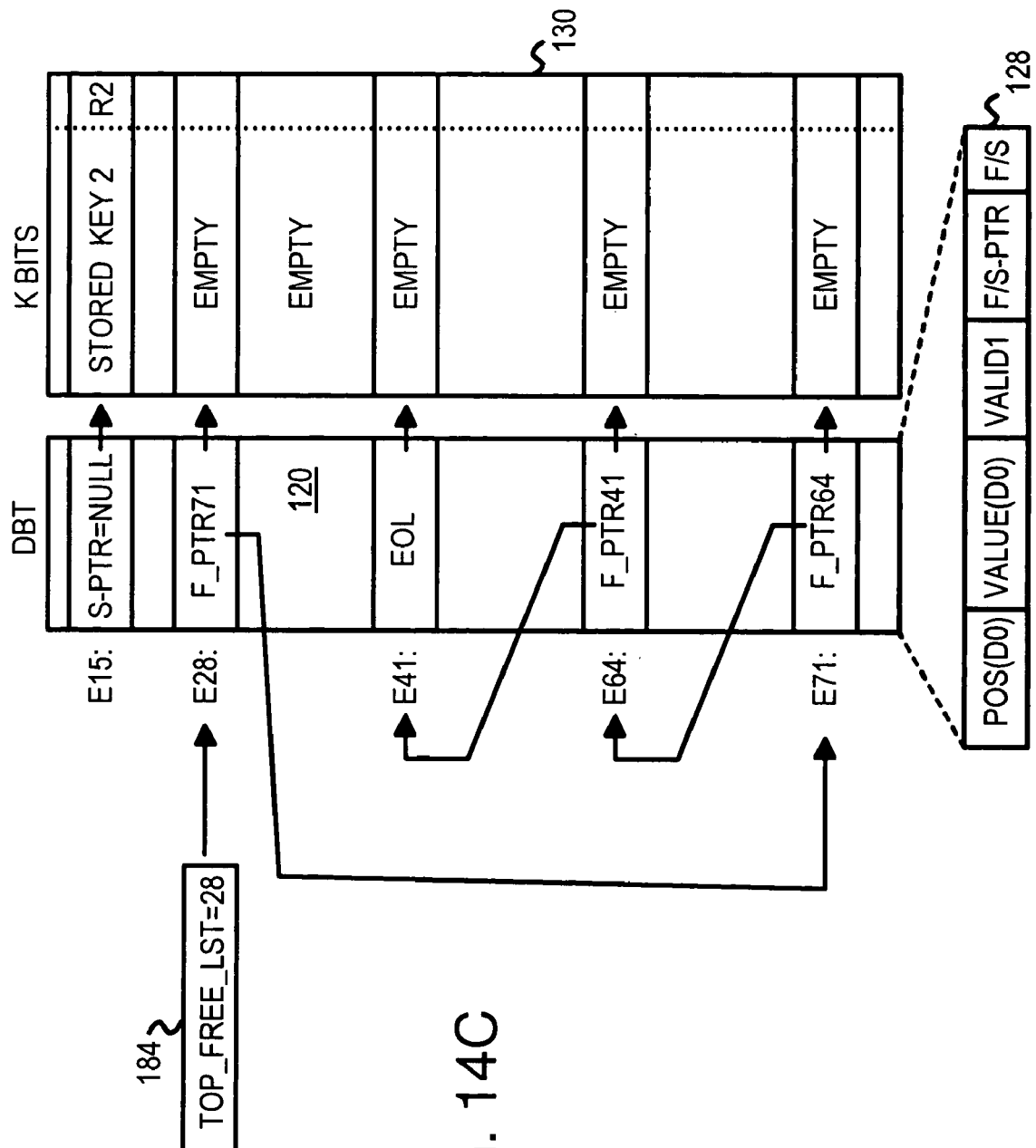

In FIG. 14C, DBT entry 15 is changed to be a primary pointer that points to stored key 2 as the primary key. Stored key 2 is now a primary key rather than a secondary key. DBT entry 15 is loaded with its VALID1 bit set, and with its secondary pointer S-PTR set to null, not pointing to any valid entry.

The secondary pointer S-PTR in DBT entry 28 is no longer needed. Thus all of DBT entry 28 is now free and can be added to the free list for recycling.

The old pointer value in top-of-free list pointer 184, F_PTR71, which pointed to DBT entry 71, is copied to the S-PTR field in DBT entry 28, and the F/S bit set. Top-of-free list pointer 184 is loaded with new pointer F_PTR28, which points to DBT entry 28, which is the index of the invalidated primary key. The free list now points to DBT entry 28 before linking to the old free entries 71, 64, 41.

Figure 14D:
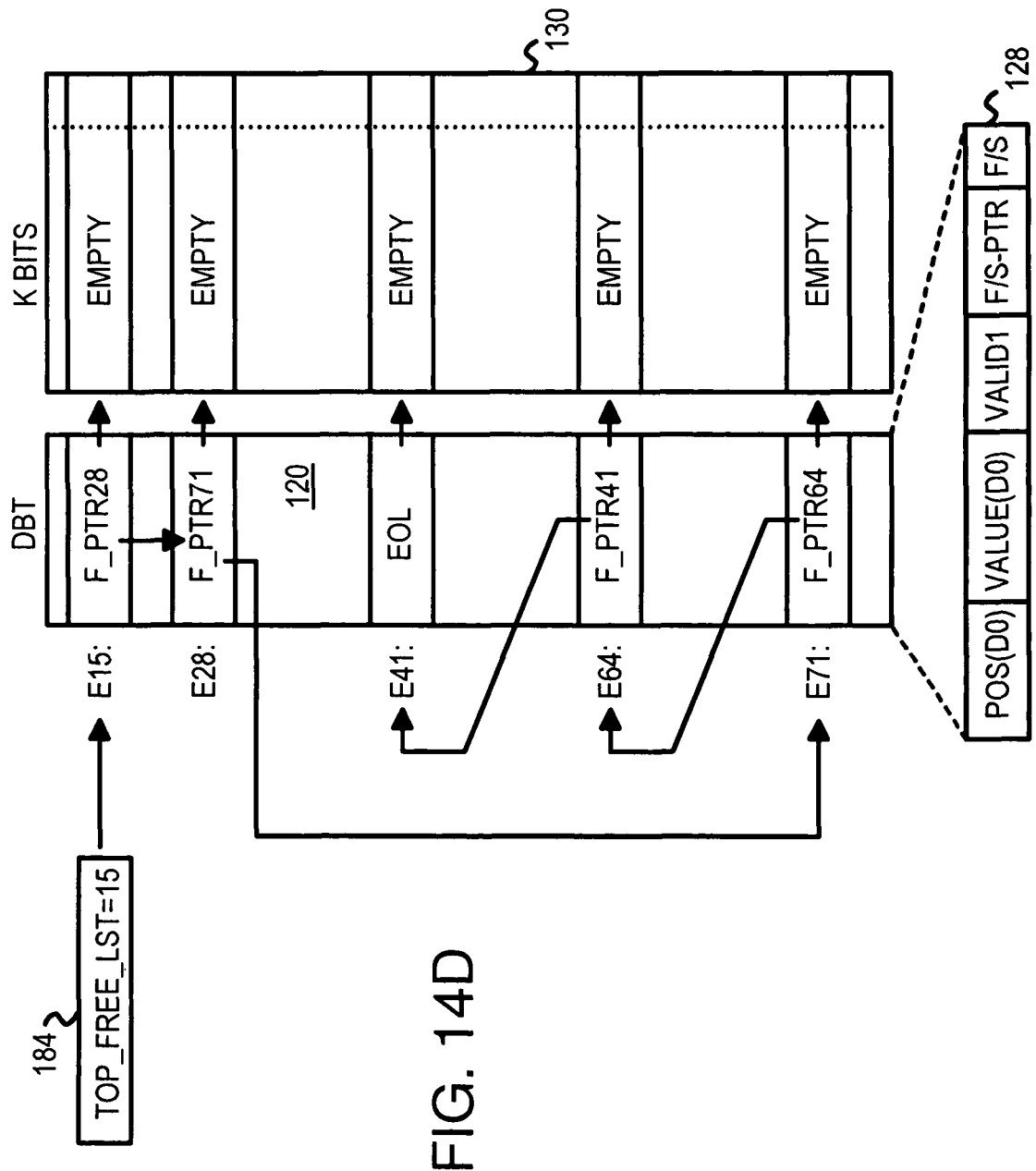

In FIG. 14D, after more time, stored key 2 is also invalidated. DBT entry 15 is no longer needed, since both its primary and secondary keys are invalid. DBT entry 15 can be added to the free chain and recycled.

The old pointer value in top-of-free list pointer 184, F_PTR28, which pointed to DBT entry 28, is copied to the S-PTR field in DBT entry 15, and the F/S bit set.

Top-of-free list pointer 184 is loaded with new pointer F_PTR15, which points to DBT entry 15, which is the index of the invalidated stored key 2. The free list now points to DBT entries 15, then 28, before linking to the old free entries 71, 64, 41. Other variations are possible, such as linking to the primary entry before the secondary entry. The free pointer chain could also be bi-directional by having both forward and reverse pointers stored for each entry. The reverse pointer could be stored in the location of the D1, D0 location field, or in another field.

Alternate Embodiments

Several other embodiments are contemplated by the inventors. For example, while simple examples have been shown to facilitate understanding, more complex situations can be handled by processors and other electronic equipment in more practical uses. Compression, masking, memory management, and other functions may be implemented as hardware gates, programmable logic, or other hardware, firmware, software, or various combinations thereof. A table could be implemented as a SRAM, DRAM, ROM, EEPROM, flash memory, programmable logic, or other kind of technology and may be part of a later memory or array, and be integrated with other functional blocks.

Seed 25 (FIG. 6) could be used with any or all embodiments including the fast-updating deterministic hash-based lookup embodiments of FIGS. 11-14. Rather than pre-pending seed 25 to input key 24, seed 25 could be attached to the end, or inserted into the middle of input key 24, or merged with input key 24 such as by using XOR functions or other functions. Seed 25 could also be directly input to hash engine 26 to alter the hash function, rather than pre-pended to input key 24.

While tables for a particular size but for different strides could be stored separately, same-size tables for different strides (levels) could be stored together. When entries have different sizes (bytes per entry), the number of tables per page can change. For example, some stride levels may have 4 Byte entries while others have 8-byte entries. The final stride level could have large entries, such as 14 bytes.

Additional levels of tables or buckets could be added to increase a number of collisions allowed, such as adding more levels of discriminant bit tables 120 or bucket tables 33, 33' or bucket 32. Default branches are not a requirement. Rather than explicitly define only half of the entries at a level, and have the remaining entries be "default" values that take a default pointer, all entries at a level could be defined, and no default used. The table of FIG. 11 that does not use default paths could be extended to have additional levels, such as shown in FIG. 13, but without default paths and default pointers. Entries may be fully defined, rather than having default values.

The initial mask is optional and may be used with some embodiments and not with other embodiments. Some levels of stride tables may use the initial mask while other levels do not use the initial mask. Some stride-table entries may have extra bytes that allow for longer masks while other entries may have short formats with few or no bytes available for masking. Formats may vary for different stride levels and embodiments.

A wide variety of other compression functions may be supported. For example, the number of leading 1's or 0's may be counted and compressed. Complex logical gates may be substituted, or multiple levels of logical gates, or gates with wider inputs or multiple outputs. Inversions could be added. Some operations may be conditional, such as a conditional rotate or conditional shift. Compression functions that are priority encoders or leading-one or leading-zero encoders and compressors may be supported. Encryption or signature algorithms may be supported. Designers may devise complex compression functions that are particularly useful for compressing certain kinds of stride tables. Encryption algorithms could be used as compression functions. A subset of the possible compression functions may be supported, such as only XOR functions while AND and OR functions are not supported. These functions could be implemented as data stored in function tables, or as hardware logic, or programmably such as with updatable software or firmware.

Stride tables with only one valid entry may be compressed using an identity function as the compression function. All values of stride bits then point to the only entry for that table. When a table has only two valid entries, a single bit may be generated to distinguish between the two entries.

The compressed stride table can be a perfect hash table wherein there are no collisions between valid entries. The stride-value tag field may not be required in all embodiments. When the stride table is fully compressed, it can be a minimal perfect hash table. A minimal, fully-compressed table has a size that is the nearest power of two that is equal to or greater than the number of valid entries in the table. Collisions could be allowed in the compressed index in some embodiments. A bucket containing two or more entries could be allowed when collisions occur.

Not all fields need to be present in each entry. For example, when the stride size is fixed in the table design, the stride size field is not needed. Some levels of the stride tables could use fixed, predetermined strides, and prior-level entries pointing to these tables do not need the stride size field, while other levels have a variable stride size and their prior-level entries have the stride size field. Result pointers are only needed for final-level entries or when an intermediate or current result is present. The final level tables might not need pointers to next-level tables when there is no next level to point to.

Other fields could be added to various entries, such as memory or table management fields. Fields could be formatted in a variety of ways and encodings, and may be combined or split. Regional entries could be supported in other ways such as pointers to additional tables or entries. Various formats and physical embodiments to the stride tables are possible. Other modifications to the basic multi-bit Trie structure and lookup key formats are possible.

Some table structures or levels within a table structure may not implement all compression functions, but only support a subset of the functions. For example, supporting XOR alone may be sufficient, without supporting AND and OR compression functions. Merged bits could be generated for each of the supported functions, including some of the more complex functions such as shifts, and used to select from among the merged bits that were generated using the various compression functions to find the best set of discriminant bits. All possible compression functions could be tested during initialization to find the optimal functions to use. More complex or simplified routines may be substituted. The routine to find discriminant bits could iterate over several levels at a time rather than over one level, or an exhaustive search over all possible combinations of bits may be performed and evaluated to find deterministic bits.

Values can be inverted, offset, combined with other values, and manipulated in many ways using known mathematical properties. For example, rather than finding the maximum delta, the delta could be inverted to a negative number and then the smallest (most negative) delta could be chosen as the "maximum" delta. An inversion could be added to an XOR to generate an exclusive-NOR (XNOR), but this is simply a derivative of an XOR and within a family of XOR functions. Other logic tricks and manipulations are contemplated and considered to be within the scope of the claims.

In yet another variation, three levels of masking are used. The compressor creates initial compressed index bits, and then using compressed bits, creates a new index bit set having only new candidate bits selected with the mask applied over only new candidate bits. In this alternative, a final selection is made between the Index bits selected from the input bits only, or index bits selected from the new candidate bits created from the original selected index bits from input bits only.

Any advantages and benefits described may not apply to all embodiments of the invention. When the word "means" is recited in a claim element, Applicant intends for the claim element to fall under 35 USC Sect. 112, paragraph 6. Often a label of one or more words precedes the word "means". The word or words preceding the word "means" is a label intended to ease referencing of claim elements and is not intended to convey a structural limitation. Such means-plus-function claims are intended to cover not only the structures described herein for performing the function and their structural equivalents, but also equivalent structures. For example, although a nail and a screw have different structures, they are equivalent structures since they both perform the function of fastening. Claims that do not use the word "means" are not intended to fall under 35 USC Sect. 112, paragraph 6. Signals are typically electronic signals, but may be optical signals such as can be carried over a fiber optic line.

The foregoing description of the embodiments of the invention has been presented for the purposes of illustration and description. It is not intended to be exhaustive or to limit the invention to the precise form disclosed. Many modifications and variations are possible in light of the above teaching.

It is intended that the scope of the invention be limited not by this detailed description, but rather by the claims appended hereto.

I claim:

1. A hashed lookup table structure comprising:

hardware gates or a processor for executing a lookup operation;

a memory for storing data used by the lookup operation;

input means for receiving an input key for the lookup operation;

key hashing means, receiving the input key, for generating a hashed key that is a compressed hash of the input key;

stride table means for locating a final-level entry using strides of bits from the hashed key to index stride tables arranged in multiple levels;

a first bucket pointer stored in the final-level entry;

a first discriminant bit-position locator stored in the final-level entry;

a plurality of bucket tables, each bucket table for storing a plurality of key entries, each key entry for storing a stored key and a result pointer;

bucket locator means, receiving the first bucket pointer from the final-level entry, for locating a selected bucket table in the plurality of bucket tables using the first bucket pointer;

key-select-bit locator means for locating and reading a key-select bit in the input key located at a bit-position within the input key indicated by the first discriminant bit-position locator stored in the final-level entry;

bucket index means for selecting a selected key entry in the selected bucket table pointed to by the first bucket pointer, the bucket index means reading a state of the key-select bit read from the input key by the key-select-bit locator means to determine which key entry in the selected bucket table to select as the selected key entry; and verify means for comparing a selected stored key in the selected key entry to the input key, and for outputting a lookup result generated from a selected result pointer associated with the selected stored key when a match occurs, whereby the selected stored key is indexed using the key-select bit within the selected bucket table pointed to by the final-level entry of the stride tables.

2. The hashed lookup table structure of claim 1 further comprising:

a second bucket pointer stored in the final-level entry;

a second discriminant bit-position locator stored in the final-level entry;

second bucket locator means, receiving the second bucket pointer from the final-level entry, for locating a selected second bucket table in the plurality of bucket tables using the second bucket pointer;

second key-select-bit locator means for locating and reading a second key-select bit in the input key located at a second bit-position within the input key indicated by the second discriminant bit-position locator stored in the final-level entry;

second bucket index means for selecting a selected second key entry in the selected second bucket table pointed to by the second bucket pointer, the second bucket index means reading a state of the second key-select bit read from the input key by the second key-select-bit locator means to determine which key entry in the selected second bucket table to select as the selected second key entry; and second verify means for comparing a selected second stored key in the selected second key entry to the input key, and for outputting a lookup result generated from a selected second result pointer associated with the selected second stored key when a match occurs, whereby two bucket tables are pointed to by the final-level entry.

3. The hashed lookup table structure of claim 2 wherein the stride table means further comprises:

hash table means for storing a plurality of the final-level entries in a single table that is indexed by a subset of S0 bits from the hashed key;

and wherein the key hashing means further comprises a seed value, the seed value being input to the key hashing means to alter generation of the hashed key from the input key, whereby seeded input keys generate hashed keys.

4. The hashed lookup table structure of claim 1 wherein the first discriminant bit-position locator stored in the final-level entry identifies a pair of bit-positions within the input key;

wherein the key-select-bit locator means locates and reads a pair of the key-select bits in the input key;

wherein the bucket index means selects the selected key entry in the selected bucket table by reading states of both bits in the pair of the key-select bit, whereby the pair of the key-select bits selects the selected key entry in the selected bucket table.

5. The hashed lookup table structure of claim 4 wherein the stride table means further comprises:

stride means for extracting multi-bit strides from the hashed key, each of the multi-bit strides for selecting a selected entry from stride tables at a level of tables corresponding to a location of the multi-bit stride within the hashed key;

compress means, receiving a multi-bit stride for a level L in the level of tables, and receiving a function indicator stored in a prior selected entry in a stride table in a prior level L−1 in the level of tables, for compressing the multi-bit stride to form a compressed index having fewer bits than the multi-bit stride, wherein the function indicator indicates a type of operation to combine bits within the multi-bit stride;

locator means, receiving a table pointer from the prior selected entry and receiving the compressed index generated by the compress means, wherein a selected stride table is selected by the table pointer, for locating a selected entry within the selected stride table, the selected entry being selected by the compressed index; and next-level pointer means for reading a next-table pointer from the selected entry to locate a stride table for a next level L+1 in the level of tables;

wherein when the selected entry is in a final level in the level of tables, the selected entry is a final-level entry.

* * * * *